(12) United States Patent
Duan et al.

(10) Patent No.: US 12,498,474 B2
(45) Date of Patent: Dec. 16, 2025

(54) RECONFIGURABLE INTELLIGENT SURFACE (RIS) AIDED ROUND-TRIP-TIME (RTT)-BASED USER EQUIPMENT (UE) POSITIONING

(71) Applicant: QUALCOMM Incorporated, San Diego, CA (US)

(72) Inventors: Weimin Duan, San Diego, CA (US); Alexandros Manolakos, Escondido, CA (US); Jing Lei, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 241 days.

(21) Appl. No.: 18/546,051

(22) PCT Filed: Jan. 25, 2022

(86) PCT No.: PCT/US2022/013704
§ 371 (c)(1),
(2) Date: Aug. 10, 2023

(87) PCT Pub. No.: WO2022/203754
PCT Pub. Date: Sep. 29, 2022

(65) Prior Publication Data
US 2024/0319359 A1    Sep. 26, 2024

(30) Foreign Application Priority Data
Mar. 22, 2021    (GR) .............................. 20210100180

(51) Int. Cl.
*G01S 13/76* (2006.01)
*H01Q 3/46* (2006.01)
*H01Q 15/14* (2006.01)

(52) U.S. Cl.
CPC ............ *G01S 13/762* (2013.01); *H01Q 3/46* (2013.01); *H01Q 15/148* (2013.01)

(58) Field of Classification Search
CPC ....... G01S 13/762; H01Q 3/46; H01Q 15/148
(Continued)

(56) References Cited

U.S. PATENT DOCUMENTS 10,560,955 B2 *   2/2020   Shoshan ............... H04W 72/04
2009/0073031 A1   3/2009   Kim
(Continued)

FOREIGN PATENT DOCUMENTS

CN    111245494 A     6/2020
JP    2009538028 A   10/2009
(Continued)

OTHER PUBLICATIONS

International Search Report and Written Opinion—PCT/US2022/013704—ISA/EPO—May 27, 2022.
(Continued)

*Primary Examiner* — Michael R Neff
(74) *Attorney, Agent, or Firm* — Thien T. Nguyen

(57) ABSTRACT

Disclosed are techniques for positioning. In an aspect, a positioning entity receives a report indicating an operation mode of a reconfigurable intelligent surface (RIS) associated with at least one base station, receives a transmission-to-reception (Tx-Rx) time difference measurement for a network node involved in a round-trip-time (RTT) positioning session with a user equipment (UE), determines a reception-to-transmission (Rx-Tx) time difference measurement for the UE, the Rx-Tx time difference measurement representing a difference between a reception time at the UE of a downlink positioning reference signal from the RIS and a transmission time from the UE of an uplink positioning reference signal towards the RIS, and calculates a distance
(Continued)

between the UE and the RIS based, at least in part, on the Tx-Rx time difference measurement and the Rx-Tx time difference measurement.

46 Claims, 13 Drawing Sheets

(58) Field of Classification Search
USPC .......................................................... 455/63.4
See application file for complete search history.

(56) References Cited

U.S. PATENT DOCUMENTS

| | | |
|---|---|---|
| 2020/0205104 A1 | 6/2020 | Akkarakaran et al. |
| 2020/0229126 A1 | 7/2020 | Soriaga et al. |
| 2021/0013619 A1 | 1/2021 | Alkhateeb et al. |
| 2023/0176174 A1* | 6/2023 | Penna ..................... H01Q 3/46 342/451 |

FOREIGN PATENT DOCUMENTS

| | | |
|---|---|---|
| JP | 2024534843 A | 9/2024 |
| WO | WO-2023025888 A2 | 3/2023 |

OTHER PUBLICATIONS

Wymeersch H., et al., "Radio Localization and Mapping with Reconfigurable Intelligent Surfaces", arxiv.org, 201 Olin Library Cornell University, Ithaca, NY, 14853, Dec. 19, 2019, XP081569725, pp. 1-7, Figure 1, Abstract, Right-Hand col. Lines 29-31, Figure 3, pp. 5,6, p. 2, left-hand column line 2-8 p. 3, left-hand column line 2-4 p. 4, right-hand col. lines 6, 7, 11, 12, 36, 37 p. 5, left-hand column line 15-17, pp. 5,6, Figure 3, pp. 4-5, Section RIS Control.
Taiwan Search Report—TW111103344—TIPO—Aug. 27, 2025.
Samsung Electronics Research Institute (UK): "Regarding the Effect of Repeaters on Positioning Accuracy", TSG-RAN Working Group 2 meeting #21, TSG R2-011372, Busan, Korea, May 21-25, 2001, May 28, 2001, pp. 1-6.

* cited by examiner

RECONFIGURABLE INTELLIGENT SURFACE (RIS) AIDED ROUND-TRIP-TIME (RTT)-BASED USER EQUIPMENT (UE) POSITIONING

CROSS-REFERENCE TO RELATED APPLICATION

The present application for patent claims the benefit of GR Application No. 20210100180, entitled "RECONFIGURABLE INTELLIGENT SURFACE (RIS) AIDED ROUND-TRIP-TIME (RTT)-BASED USER EQUIPMENT (UE) POSITIONING", filed Mar. 22, 2021, and is a national stage application, filed under 35 U.S.C. § 371, of International Patent Application No. PCT/US2022/013704, entitled, "RECONFIGURABLE INTELLIGENT SURFACE (RIS) AIDED ROUND-TRIP-TIME (RTT)-BASED USER EQUIPMENT (UE) POSITIONING", filed Jan. 25, 2022, both of which are assigned to the assignee hereof and are expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of positioning performed by a positioning entity includes receiving a report indicating an operation mode of a reconfigurable intelligent surface (RIS) associated with at least one base station: receiving a transmission-to-reception (Tx-Rx) time difference measurement for a network node involved in a round-trip-time (RTT) positioning session with a user equipment (UE); determining a reception-to-transmission (Rx-Tx) time difference measurement for the UE, the Rx-Tx time difference measurement representing a difference between a reception time at the UE of a downlink positioning reference signal from the RIS and a transmission time from the UE of an uplink positioning reference signal towards the RIS; and calculating a distance between the UE and the RIS based, at least in part, on the Tx-Rx time difference measurement and the Rx-Tx time difference measurement.

In an aspect, a positioning entity includes a memory; and at least one processor communicatively coupled to the memory, the at least one processor configured to: receive a report indicating an operation mode of a reconfigurable intelligent surface (RIS) associated with at least one base station; receive a transmission-to-reception (Tx-Rx) time difference measurement for a network node involved in a round-trip-time (RTT) positioning session with a user equipment (UE); determine a reception-to-transmission (Rx-Tx) time difference measurement for the UE, the Rx-Tx time difference measurement representing a difference between a reception time at the UE of a downlink positioning reference signal from the RIS and a transmission time from the UE of an uplink positioning reference signal towards the RIS; and calculate a distance between the UE and the RIS based, at least in part, on the Tx-Rx time difference measurement and the Rx-Tx time difference measurement.

In an aspect, a positioning entity includes means for receiving a report indicating an operation mode of a reconfigurable intelligent surface (RIS) associated with at least one base station; means for receiving a transmission-to-reception (Tx-Rx) time difference measurement for a network node involved in a round-trip-time (RTT) positioning session with a user equipment (UE); means for determining a reception-to-transmission (Rx-Tx) time difference measurement for the UE, the Rx-Tx time difference measurement representing a difference between a reception time at the UE of a downlink positioning reference signal from the RIS and a transmission time from the UE of an uplink positioning reference signal towards the RIS; and means for calculating a distance between the UE and the RIS based, at least in part, on the Tx-Rx time difference measurement and the Rx-Tx time difference measurement.

In an aspect, a non-transitory computer-readable medium storing computer-executable instructions includes computer-executable instructions comprising: at least one instruction instructing a positioning entity to receive a report indicating an operation mode of a reconfigurable intelligent surface (RIS) associated with at least one base station; at least one instruction instructing the positioning entity to receive a transmission-to-reception (Tx-Rx) time difference measurement for a network node involved in a round-triptime (RTT) positioning session with a user equipment (UE); at least one instruction instructing the positioning entity to determine a reception-to-transmission (Rx-Tx) time difference measurement for the UE, the Rx-Tx time difference measurement representing a difference between a reception time at the UE of a downlink positioning reference signal from the RIS and a transmission time from the UE of an uplink positioning reference signal towards the RIS; and at least one instruction instructing the positioning entity to calculate a distance between the UE and the RIS based, at least in part, on the Tx-Rx time difference measurement and the Rx-Tx time difference measurement.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
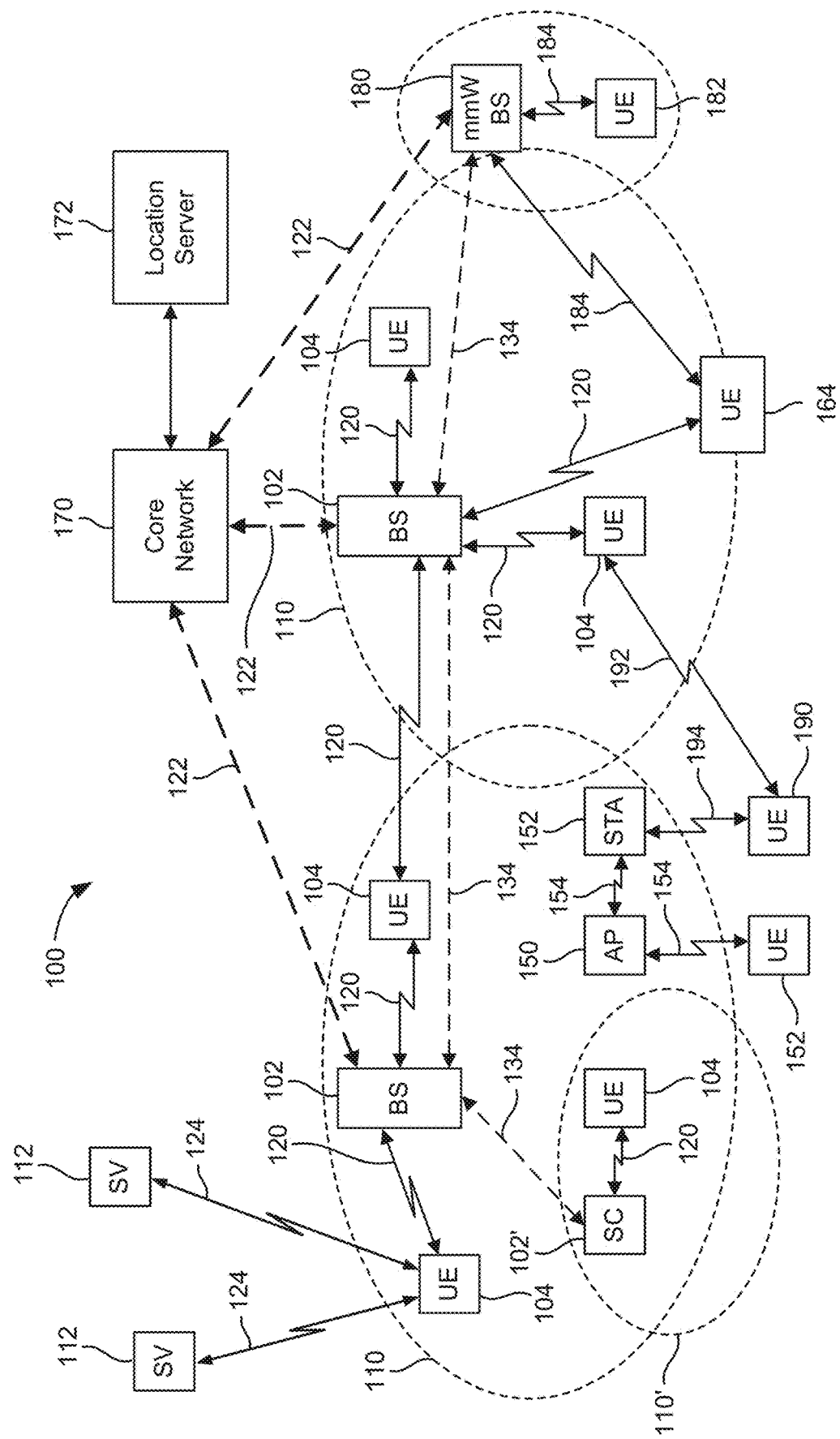
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell" "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D). WiFi Direct (WiFi-D), Bluetooth®, and so on.

Figure 2A:
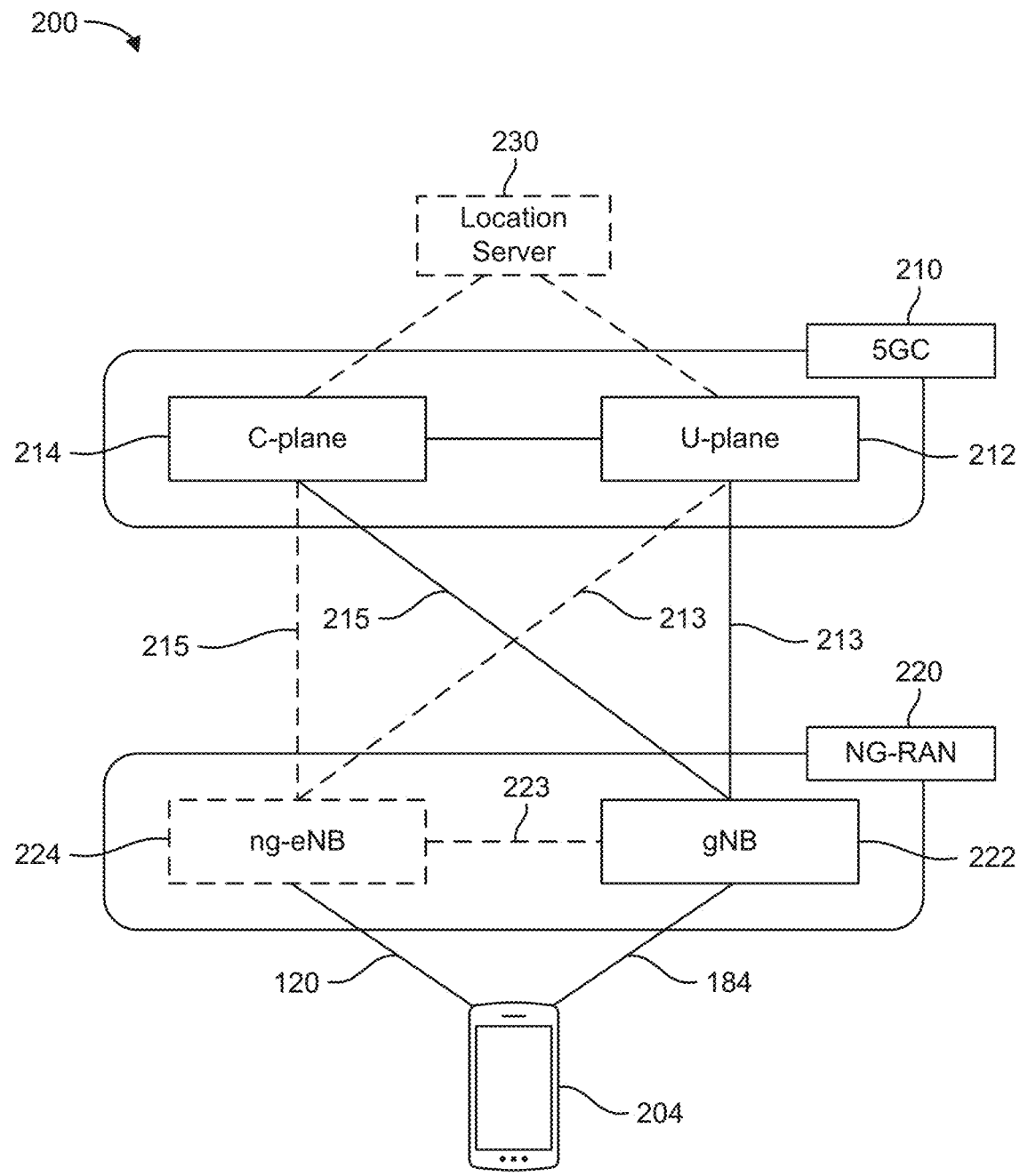
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
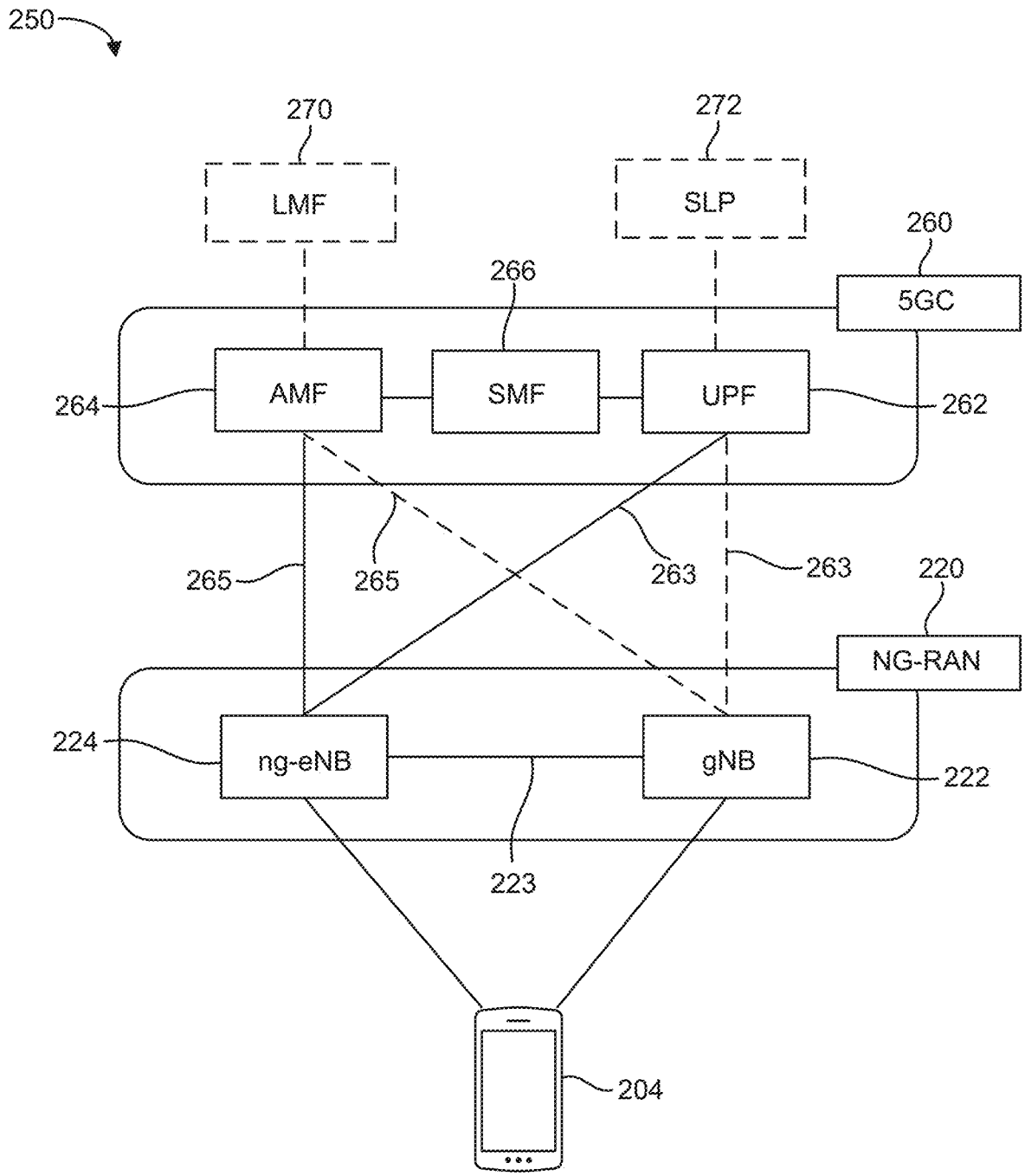

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the NG-RAN 220 may only have one or more gNBs 222, while other configurations include one or more of both ng-eNBs 224 and gNBs 222.

Either gNB 222 or ng-eNB 224 may communicate with UEs 204 (e.g., any of the UEs depicted in FIG. 1). The base stations of the NG-RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and an LMF 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
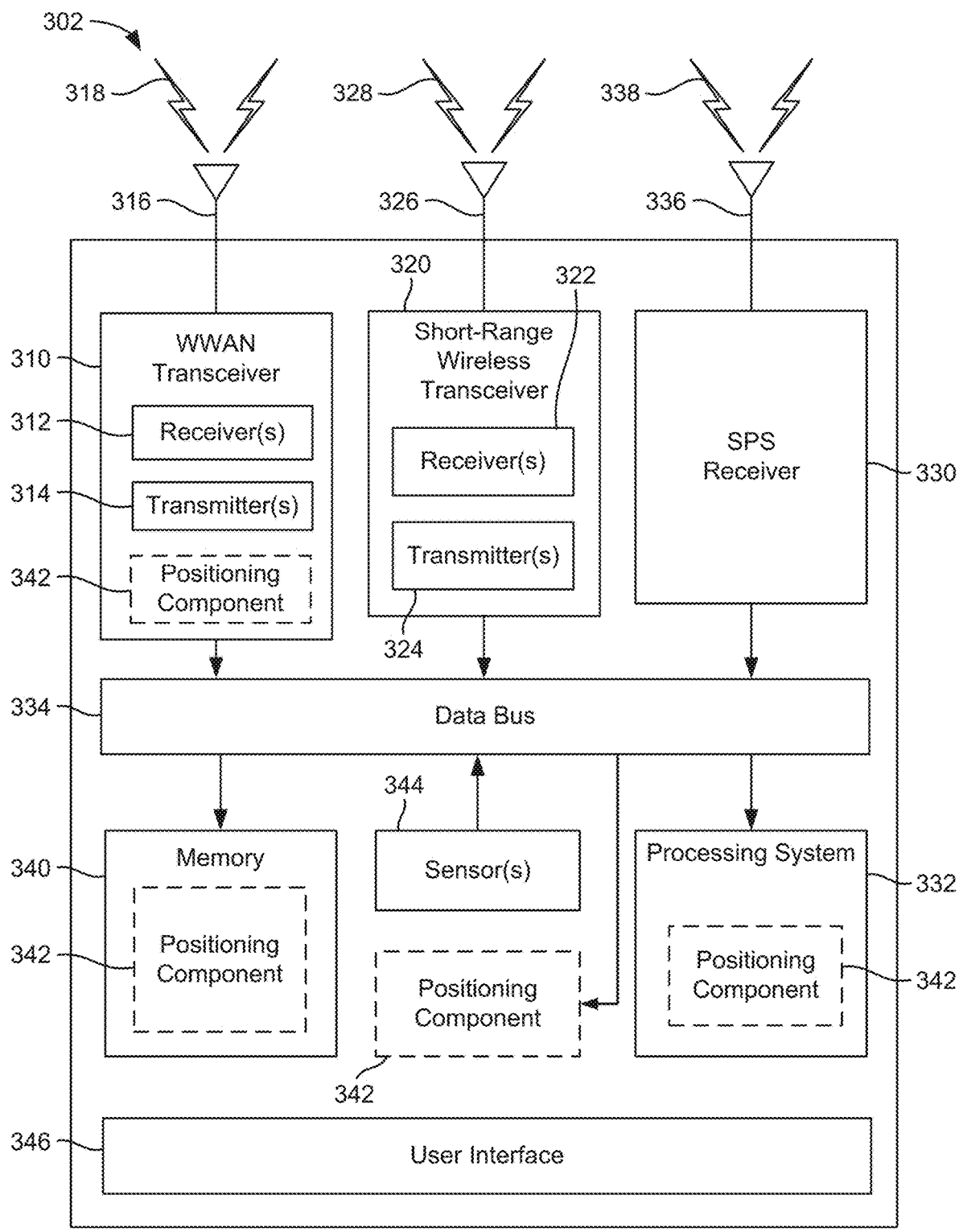
FIGS. 3A to 3C are simplified block diagrams of several sample aspects of components that may be employed in a user equipment (UE), a base station, and a network entity, respectively, and configured to support communications as taught herein.
Figure 3B:
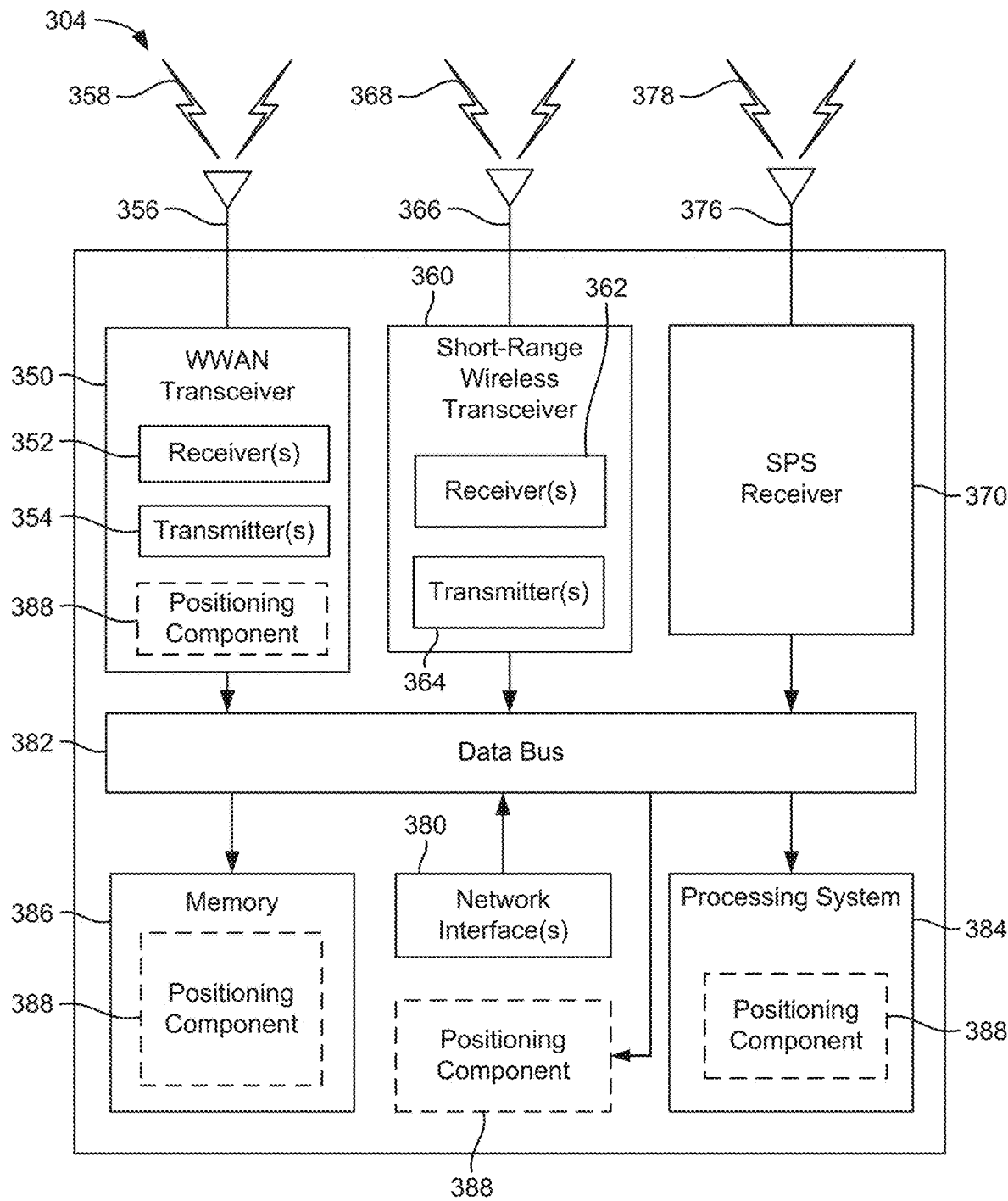
Figure 3C:
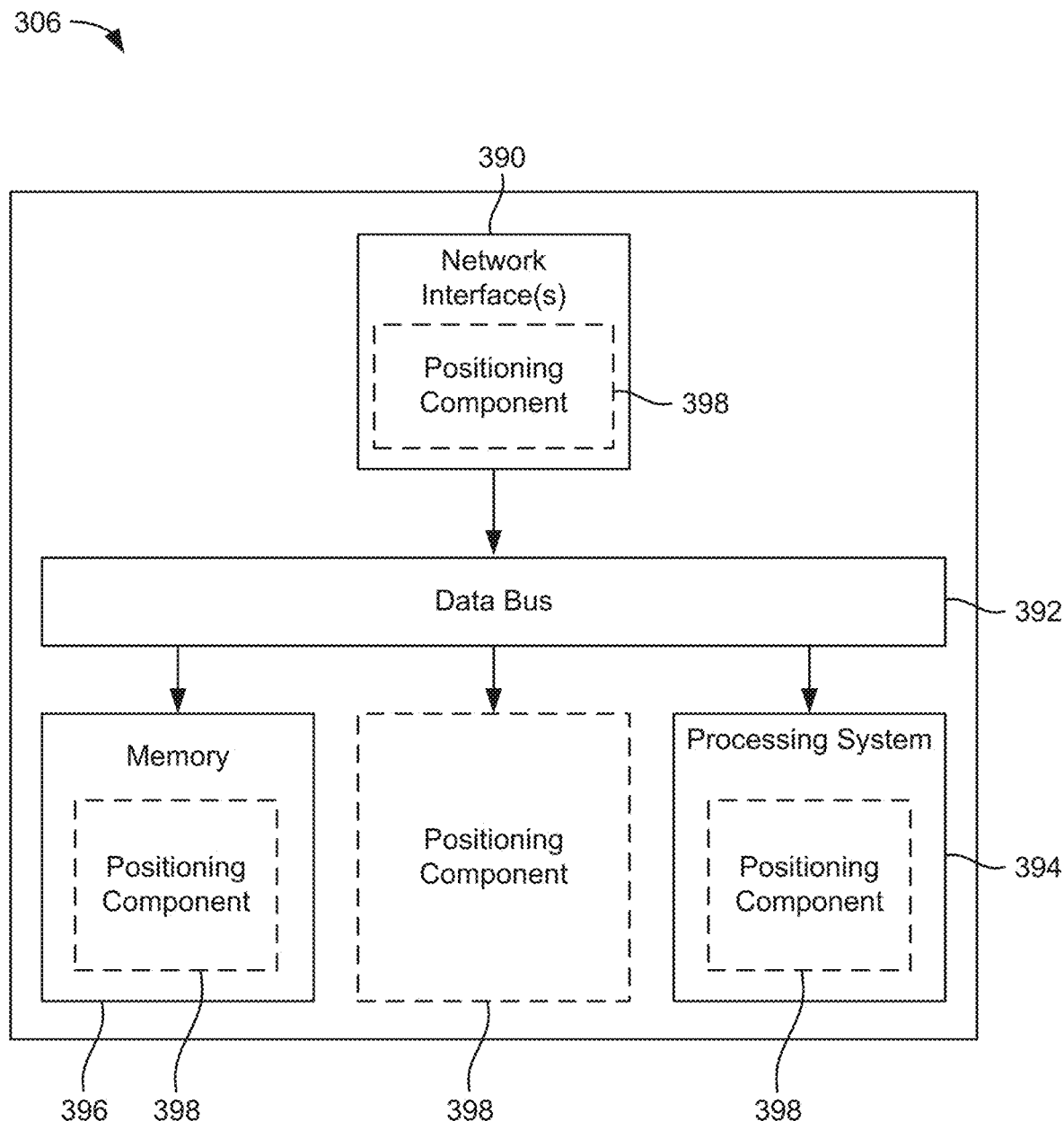

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth®, transceivers, Zigbee® and/or Z-Wave® transceivers, NFC transceivers, or vehicle-to-vehicle (V2V) and/or vehicle-to-everything (V2X) transceivers.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals. Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless positioning, and for providing other processing functionality. The base station 304 includes a processing system 384 for providing functionality relating to, for example, wireless positioning as disclosed herein, and for providing other processing functionality. The network entity 306 includes a processing system 394 for providing functionality relating to, for example, wireless positioning as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more processors, such as one or more general purpose processors, multi-core processors, ASICs, digital signal processors (DSPs), field programmable gate arrays (FPGA), other programmable logic devices or processing circuitry, or various combinations thereof.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory component 340, the processing system 332, or any combination thereof, or may be a standalone component. FIG. 3B illustrates possible locations of the positioning component 388, which may be part of the WWAN transceiver 350, the memory component 386, the processing system 384, or any combination thereof, or may be a standalone component. FIG. 3C illustrates possible locations of the positioning component 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the short-range wireless transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A to 3C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A to 3C may be implemented in various ways. In some implementations, the components of FIGS. 3A to 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processing systems 332, 384, 394, the transceivers 310, 320, 350, and 360, the memory components 340, 386, and 396, the positioning components 342, 388, and 398, etc.

Figure 4:
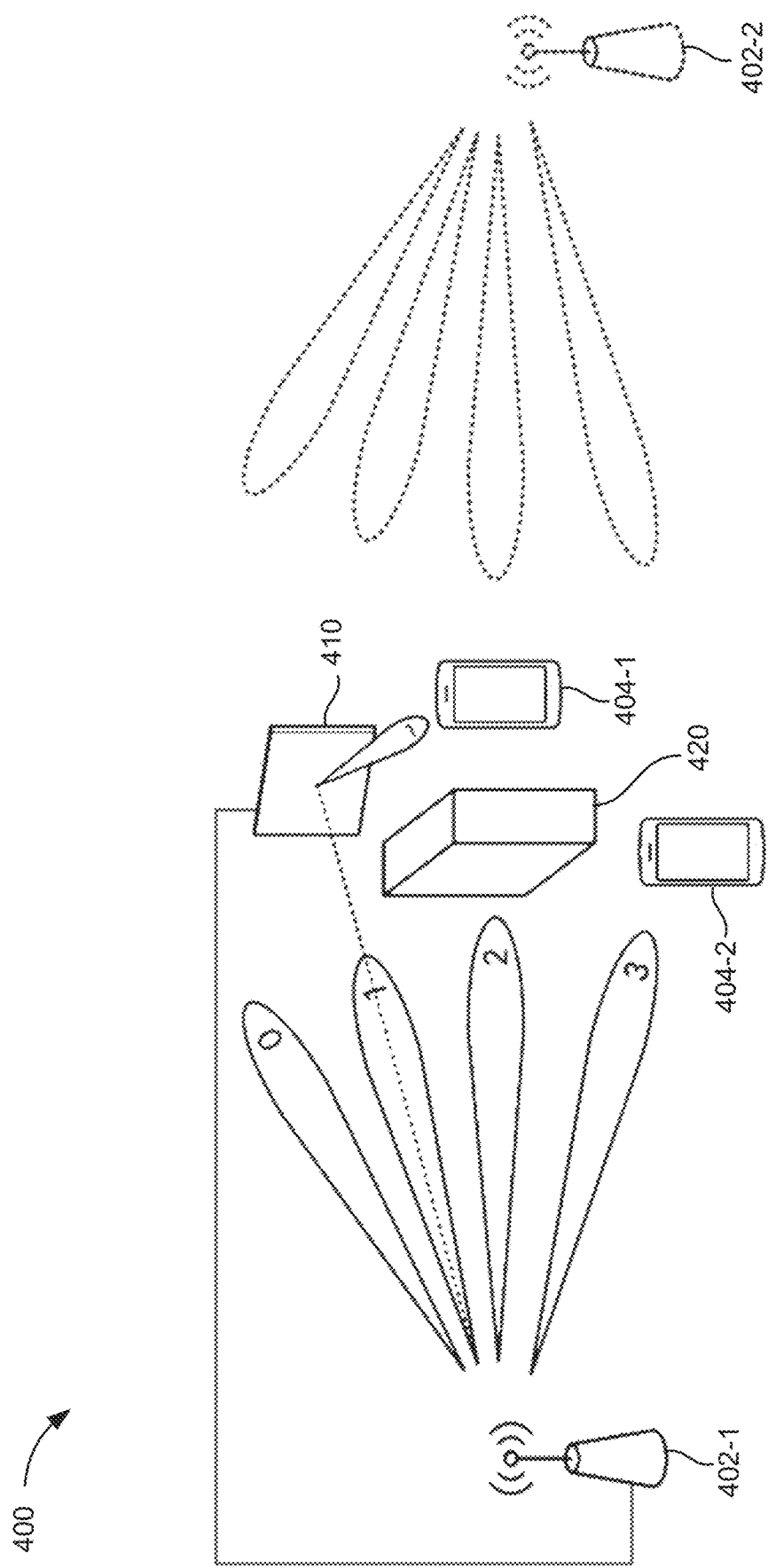
FIG. 4 illustrates an example system for wireless communication using a reconfigurable intelligent surface (RIS), according to aspects of the disclosure.

FIG. 4 illustrates an example system 400 for wireless communication using a reconfigurable intelligent surface (RIS) 410, according to aspects of the disclosure. An RIS (e.g., RIS 410) is a two-dimensional surface comprising a large number of low-cost, low-power near-passive reflecting elements whose properties are reconfigurable (by software) rather than static. For example, by carefully tuning the phase shifts of the reflecting elements (using software), the scattering, absorption, reflection, and diffraction properties of an RIS can be changed over time. In that way, the electromagnetic (EM) properties of an RIS can be engineered to collect wireless signals from a transmitter (e.g., a base station, a UE, etc.) and passively beamform them towards a target receiver (e.g., another base station, another UE, etc.). In the example of FIG. 4, a first base station 402-1 controls the reflective properties of an RIS 410 in order to communicate with a first UE 404-1.

The goal of RIS technology is to create smart radio environments, where the wireless propagation conditions are co-engineered with the physical layer signaling. This enhanced functionality of the system 400 can provide technical benefits in a number of scenarios.

As a first example scenario, as shown in FIG. 4, the first base station 402-1 (e.g., any of the base station described herein) is attempting to transmit downlink wireless signals to the first UE 404-1 and a second UE 404-2 (e.g., any two of the UEs described herein, collectively, UEs 404) on a plurality of downlink transmit beams, labeled "0." "1," "2," and "3." However, unlike the second UE 404-2, because the first UE 404-1 is behind an obstacle 420 (e.g., a building, a hill, or another type of obstacle), it cannot receive the wireless signal on what would otherwise be the line-of-sight (LOS) beam from the first base station 402-1, that is, the downlink transmit beam labeled "2." In this scenario, the first base station 402-1 may instead use the downlink transmit beam labeled "1" to transmit the wireless signal to the RIS 410, and configure the RIS 410 to reflect/beamform the incoming wireless signal towards the first UE 404-1. The first base station 402-1 can thereby transmit the wireless signal around the obstacle 420.

Note that the first base station 402-1 may also configure the RIS 410 for the first UE's 404-1 use in the uplink. In that case, the first base station 402-1 may configure the RIS 410 to reflect an uplink signal from the first UE 404-1 to the first base station 402-1, thereby enabling the first UE 404-1 to transmit the uplink signal around the obstacle 420.

As another example scenario in which system 400 can provide a technical advantage, the first base station 402-1 may be aware that the obstacle 420 may create a "dead zone," that is, a geographic area in which the downlink wireless signals from the first base station 402-1 are too attenuated to be reliably detected by a UE within that area (e.g., the first UE 404-1). In this scenario, the first base station 402-1 may configure the RIS 410 to reflect downlink wireless signals into the dead zone in order to provide coverage to UEs that may be located there, including UEs about which the first base station 402-1 is not aware.

An RIS (e.g., RIS 410) may be designed to operate in either a first mode (referred to as "Mode 1"), in which the RIS operates as a reconfigurable mirror (i.e., reflector), or a second mode (referred to as "Mode 2"), in which the RIS operates as a receiver and transmitter (similar to the amplify and forward functionality of a relay node). Some RIS may be designed to be able to operate in either Mode 1 or Mode 2, while other RIS may be designed to operate only in either Mode 1 or Mode 2. Mode 1 RIS are assumed to have a negligible group delay, whereas Mode 2 RIS have a non-negligible group delay due to being equipped with limited baseband processing capability. Because of their greater processing capability compared to Mode 1 RIS, Mode 2 RIS may, at least in some cases, be able to compute and report their transmission-to-reception (Tx-Rx) time difference measurements (i.e., the difference between the time a signal is reflected toward a UE and the time the signal is received back from the UE). In the example of FIG. 4, the RIS 410 may be either a Mode 1 or Mode 2 RIS.

FIG. 4 also illustrates a second base station 402-2 that may transmit downlink wireless signals to one or both of the UEs 404. As an example, the first base station 402-1 may be a serving base station for the UEs 404 and the second base station 402-2 may be a neighboring base station. The second base station 402-2 may transmit downlink positioning reference signals to one or both of the UEs 404 as part of a positioning procedure involving the UE(s) 404. Alternatively or additionally, the second base station 402-2 may be a secondary cell for one or both of the UEs 404. In some cases, the second base station 402-2 may also be able to reconfigure the RIS 410, provided it is not being controlled by the first base station 402-1 at the time.

Figure 5:
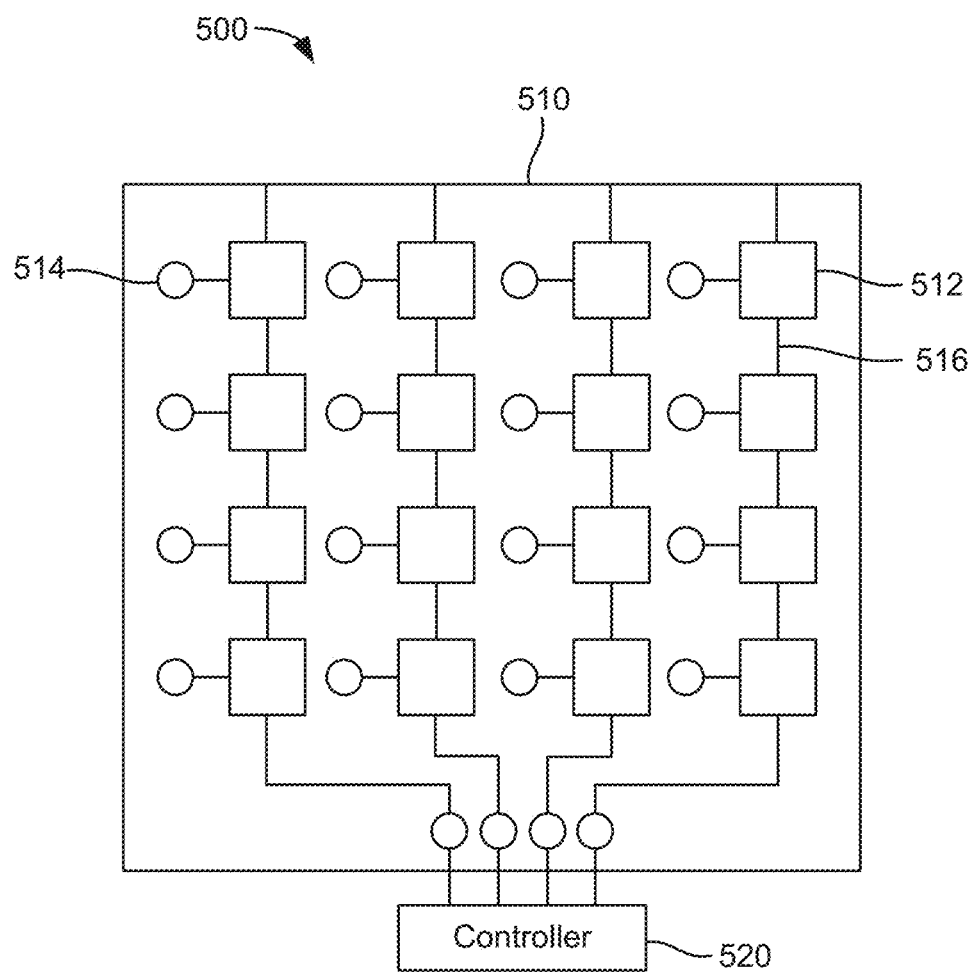
FIG. 5 is a diagram of an example architecture of a RIS, according to aspects of the disclosure.

FIG. 5 is a diagram of an example architecture of a RIS 500, according to aspects of the disclosure. The RIS 500, which may correspond to RIS 410 in FIG. 4, may be a Mode 1 RIS. As shown in FIG. 5, the RIS 500 primarily consists of a planar surface 510 and a controller 520. The planar surface 510 may be constructed of one or more layers of material. In the example of FIG. 5, the planar surface 510 may consist of three layers. In this case, the outer layer has a large number of reflecting elements 512 printed on a dielectric substrate to directly act on the incident signals. The middle layer is a copper panel to avoid signal/energy leakage. The last layer is a circuit board that is used for tuning the reflection coefficients of the reflecting elements 512 and is operated by the controller 520. The controller 520 may be a low-power processor, such as a field-programmable gate array (FPGA).

In a typical operating scenario, the optimal reflection coefficients of the RIS 500 is calculated at the base station (e.g., the first base station 402-1 in FIG. 4), and then sent to the controller 520 through a dedicated feedback link. The design of the reflection coefficients depends on the channel state information (CSI), which is only updated when the CSI changes, which is on a much longer time scale than the data symbol duration. As such, low-rate information exchange is sufficient for the dedicated control link, which can be implemented using low-cost copper lines or simple cost-efficient wireless transceivers.

Each reflecting element 512 is coupled to a positive-intrinsic negative (PIN) diode 514. In addition, a biasing line 516 connects each reflecting element 512 in a column to the controller 520. By controlling the voltage through the biasing line 516, the PIN diodes 514 can switch between 'on' and 'off' modes. This can realize a phase shift difference of $\pi$ (pi) in radians. To increase the number of phase shift levels, more PIN diodes 514 can be coupled to each reflecting element 512.

An RIS, such as RIS 500, has important advantages for practical implementations. For example, the reflecting elements 512 only passively reflect the incoming signals without any sophisticated signal processing operations that would require RF transceiver hardware. As such, compared to conventional active transmitters, the RIS 500 can operate with several orders of magnitude lower cost in terms of hardware and power consumption. Additionally, due to the passive nature of the reflecting elements 512, an RIS 500 can be fabricated with light weight and limited layer thickness, and as such, can be readily installed on a wall, a ceiling, signage, a street lamp, etc. Further, the RIS 500 naturally operates in full-duplex (FD) mode without self-interference or introducing thermal noise. Therefore, it can achieve higher spectral efficiency than active half-duplex (HD) relays, despite their lower signal processing complexity than that of active FD relays requiring sophisticated self-interference cancelation.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) time difference. The initiator calculates the difference between the transmission time of the RTT measurement signal and the ToA of the RTT response signal, referred to as the transmission-to-reception (Tx-Rx) time difference. The propagation time (also referred to as the "time of flight") between the initiator and the responder can be calculated from the Tx-Rx and Rx-Tx time differences. Based on the propagation time and the known speed of light, the distance between the initiator and the responder can be determined. For multi-RTT positioning, a UE performs an RTT procedure with multiple base stations to enable its location to be triangulated based on the known locations of the base stations. RT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

There are various limitations to OTDOA-based positioning techniques. For example, GPS synchronization is limited to 50 to 100 nanoseconds (ns), limiting GPS positioning, used for the locations of the involved base stations, to an accuracy of 15 to 30 meters (m). This level of accuracy is consistent with 3GPP agreement on 50 ns synchronization. Due to the limitations of GPS, any tighter GPS synchronization would be more difficult and therefore less likely.

The above limitations to OTDOA-based positioning techniques have motivated an increasing use of RTT-based positioning techniques. In NR, there may not be precise timing synchronization across the network. Instead, it may be sufficient to have coarse time-synchronization across base stations (e.g., within a cyclic prefix (CP) duration of the orthogonal frequency division multiplexing (OFDM) symbols). RTT-based methods generally only need coarse timing synchronization, and as such, are a preferred positioning method in NR.

Figure 6:
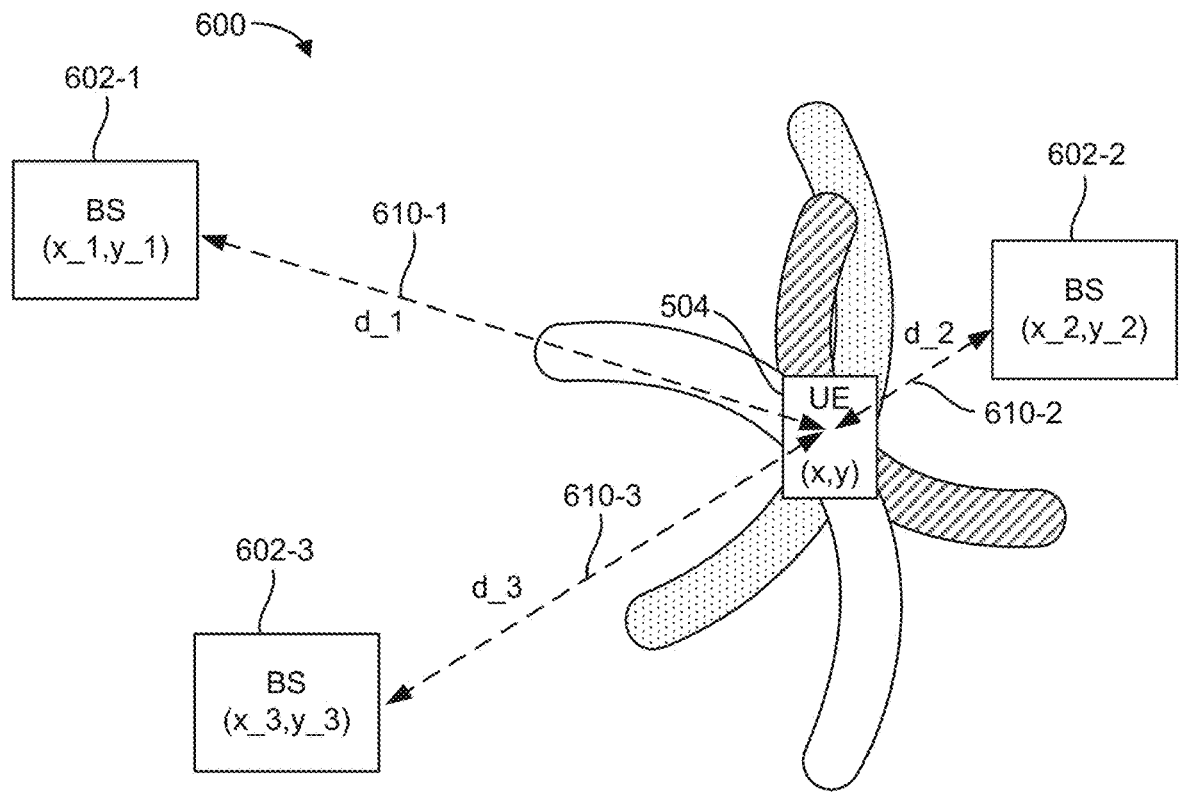
FIG. 6 is a diagram illustrating an example technique for determining a position of a UE using information obtained from a plurality of base stations.

FIG. 6 illustrates an example wireless communications system 600, according to aspects of the disclosure. In the example of FIG. 6, a UE 604 (e.g., any of the UEs described herein) is attempting to calculate an estimate of its location, or assist another entity (e.g., a base station or core network component, another UE, a location server, a third party application, etc.) to calculate an estimate of its location. The UE 604 may transmit and receive wireless signals to and from a plurality of base stations (labeled "BS") 602-1, 602-2, and 602-3 (collectively, base stations 602, which may be any of the base stations described herein).

In a network-centric RTT positioning procedure the serving base station 602 instructs the UE 604 to measure RTT measurement signals (e.g., PRS) from two or more neighboring base stations 602 (and typically the serving base station 602, as at least three base stations 602 are needed for a two-dimensional location estimate). The involved base stations 602 transmit RTT measurement signals on low reuse resources (i.e., resources used by the base station 602 to transmit system information) allocated by the network (e.g., location server 230, LMF 270, SLP 272). The UE 604 records the arrival time (also referred to as the receive time, reception time, time of reception, or time of arrival) of each RTT measurement signal relative to the UE's 604 current downlink timing (e.g., as derived by the UE 604 from a downlink signal received from its serving base station 602), and transmits a common or individual RTT response signal (e.g., SRS) to the involved base stations 602 on resources allocated by its serving base station. The UE 604, if it not the positioning entity, reports a UE reception-to-transmission (Rx-Tx) time difference measurement to the positioning entity. The UE Rx-Tx time difference measurement indicates the time difference between the arrival time of each RTT measurement signal at the UE 604 and the transmission time(s) of the RTT response signal(s). Each involved base station 602 also reports, to the positioning entity, a transmission-to-reception (Tx-Rx) time difference measurement, which indicates the difference between the transmission time of the RTT measurement signal and the reception time of the RTT response signal.

A UE-centric RTT positioning procedure is similar to the network-based procedure, except that the UE 604 transmits uplink RTT measurement signal(s) (e.g., on resources allocated by the serving base station 602). The uplink RTT measurement signal(s) are measured by multiple base stations 602 in the neighborhood of the UE 604. Each involved base station 602 responds with a downlink RTT response signal and reports a base station Rx-Tx time difference measurement to the positioning entity. The base station Rx-Tx time difference measurement indicates the time difference between the arrival time of the RTT measurement signal at the base station 602 and the transmission time of the RTT response signal. The UE 604, if it is not the positioning entity, reports, for each base station 602, a Tx-Rx time difference measurement, which indicates the difference between the transmission time of the RTT measurement signal and the reception time of the RTT response signal.

In order to determine the location (x, y) of the UE 604, the positioning entity needs to know the locations of the base stations 602, which may be represented in a reference coordinate system as (x_k, y_y), where k=1, 2, 3 in the example of FIG. 6. Where the UE 604 is the positioning entity, a location server with knowledge of the network geometry (e.g., location server 230, LMF 270, SLP 272) may provide the locations of the involved base stations 602 to the UE 604.

The positioning entity determines each distance 610 (d_k, where k=1, 2, 3) between the UE 604 and the respective base station 602 based on the Rx-Tx and Tx-Rx time difference measurements and the speed of light, as described further below with reference to FIG. 7.

Specifically, in the example of FIG. 6, the distance 610-1 between the UE 604 and the base station 602-1 is d_1, the distance 610-2 between the UE 604 and the base station 602-2 is d_2, and the distance 610-3 between the UE 604 and the base station 602-3 is d_3. Once each distance 610 is determined, the positioning entity can solve for the location (x, y) of the UE 604 by using a variety of known geometric techniques, such as, for example, trilateration. From FIG. 6, it can be seen that the location of the UE 604 ideally lies at the common intersection of three semicircles, each semicircle being defined by radius dk and center (x_k, y_k), where k=1, 2, 3.

Figure 7:
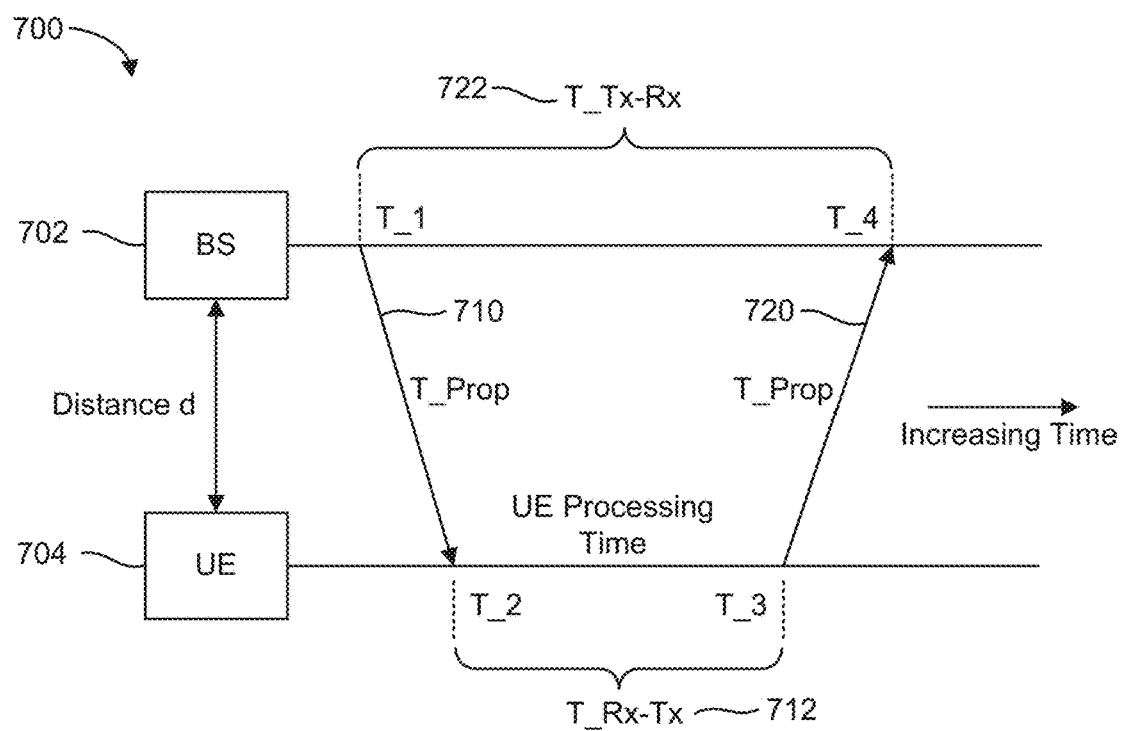
FIG. 7 is a diagram showing example timings of round-trip-time (RTT) measurement signals exchanged between a base station and a UE, according to aspects of the disclosure.

FIG. 7 is a diagram 700 showing example timings of RTT measurement signals exchanged between a base station 702 (e.g., any of the base stations described herein) and a UE 704 (e.g., any of the UEs described herein), according to aspects of the disclosure. In the example of FIG. 7, the base station 702 (labeled "BS") sends an RTT measurement signal 710 (e.g., PRS) to the UE 704 at time T_1. The RTT measurement signal 710 has some propagation delay T_Prop as it travels from the base station 702 to the UE 704. At time T_2 (the reception time of the RTT measurement signal 710 at the UE 704), the UE 704 measures the RTT measurement signal 710. After some UE processing time, the UE 704 transmits an RTT response signal 720 (e.g., SRS) at time T_3. After the propagation delay T_Prop, the base station 702 measures the RTT response signal 720 from the UE 704 at time T_4 (the reception time of the RTT response signal 720 at the base station 702).

The UE 704 reports the difference between time T_3 and time T_2 (i.e., the UE's 704 Rx-Tx time difference measurement, shown as T_Rx-Tx 712) to the positioning entity. Similarly, the base station 702 reports the difference between time T_4 and time T_1 (i.e., the base station's 702 Tx-Rx time difference measurement, shown as T_Tx-Rx 722) to the positioning entity. Using these measurements and the known speed of light, the positioning entity can calculate the distance to the UE 704 as $d=\frac{1}{2}\cdot c \cdot (T\_Tx-Rx - T\_Rx-Tx) = \frac{1}{2}\cdot c \cdot (T\_4 - T\_1) - \frac{1}{2}\cdot c \cdot (T\_3 - T\_2)$, where c is the speed of light.

Based on the known location of the base station 702 and the distance between the UE 704 and the base station 702 (and at least two other base stations 702), the positioning entity can calculate the location of the UE 704. As shown in FIG. 6, the location of the UE 704 lies at the common intersection of three semicircles, each semicircle being defined by a radius of the distance between the UE 704 and a respective base station 702.

In an aspect, the positioning entity may calculate the UE's 604/704 location using a two-dimensional coordinate system; however, the aspects disclosed herein are not so limited, and may also be applicable to determining locations using a three-dimensional coordinate system, if the extra dimension is desired. Additionally, while FIG. 6 illustrates one UE 604 and three base stations 602 and FIG. 7 illustrates one UE 704 and one base station 702, as will be appreciated, there may be more UEs 604/704 and more base stations 602/702.

Figure 8:
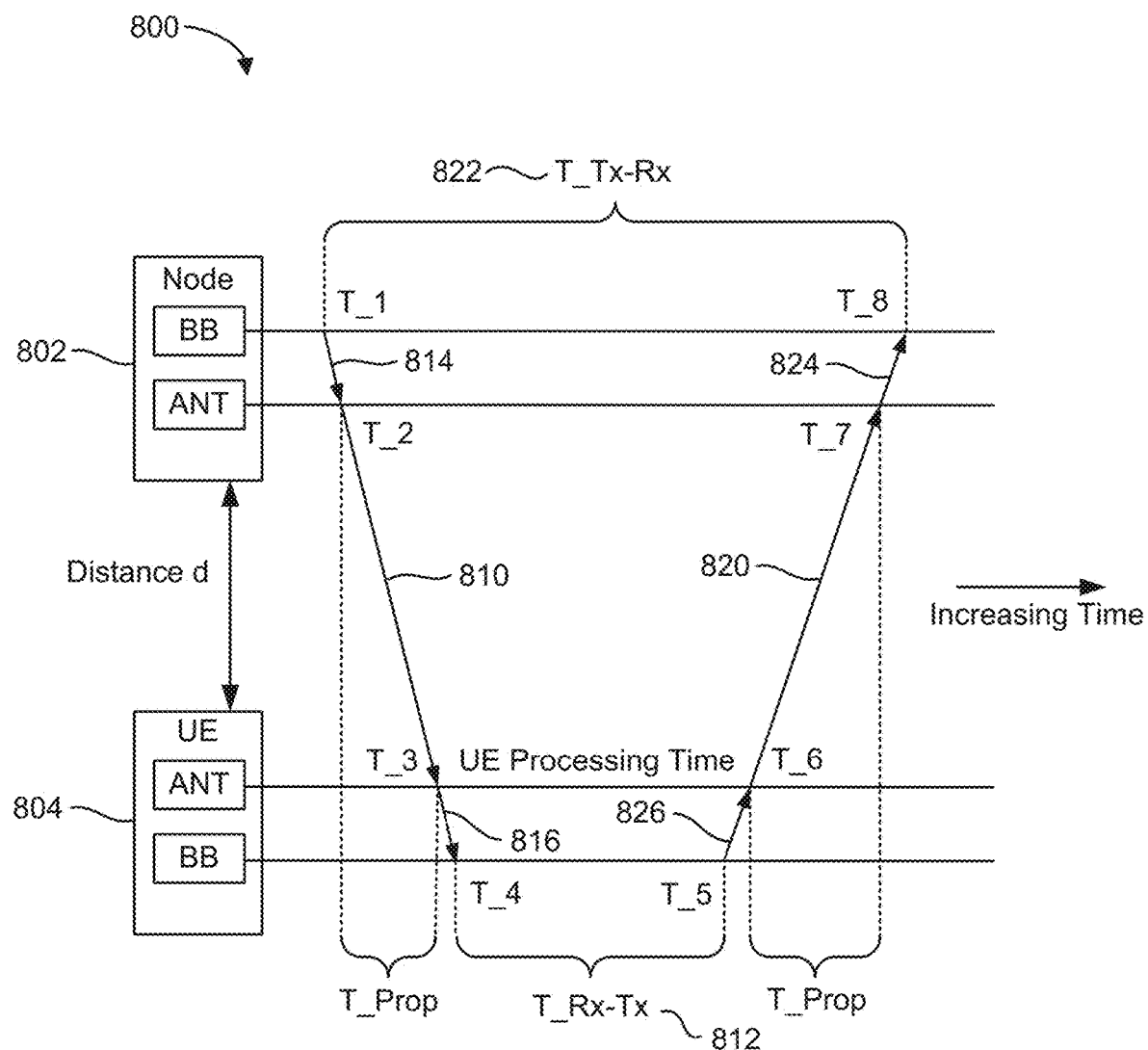
FIG. 8 is a diagram illustrating example timings of RTT measurement signals exchanged between a base station and a UE, according to aspects of the disclosure.

FIG. 8 is a diagram 800 showing example timings of RTT measurement signals exchanged between a network node 802 and a UE 804, according to aspects of the disclosure. The diagram 800 is similar to the diagram 700, except that it includes processing delays that may occur at both the network node 802 (labeled "Node") and the UE 804 when transmitting and receiving the RTT measurement and response signals. The network node 802 may be a base station (e.g., any of the base stations), an RIS (e.g., RIS 410), another UE (e.g., any of the UEs described herein), or other network node capable of performing an RTT positioning procedure. As a specific example, the network node 802 and the UE 804 may correspond to the base station 702 and the UE 704 in FIG. 7. As another specific example, the network node 802 may correspond to RIS 410 where RIS 410 is a Mode 2 RIS.

Referring now to potential processing delays, at the network node 802, there is a transmission delay 814 between the time T_1 that the network node's 802 baseband (labeled "BB") generates the RTT measurement signal 810 (e.g., a PRS) and the time T_2 that the network node's 802 antenna(s) (labeled "Ant") transmit the RTT measurement signal 810. At the UE 804, there is a reception delay 816 between the time T_3 that the UE's 604 antenna(s) (labeled "Ant") receive the RTT measurement signal 810 and the time T_4 that the UE's 804 baseband (labeled "BB") processes the RTT measurement signal 810.

Similarly, for the RTT response signal 820 (e.g., an SRS), there is a transmission delay 826 between the time T_5 that the UE's 804 baseband generates the RTT response signal 820 and the time T_6 that the UE's 804 antenna(s) transmit the RTT response signal 820. At the network node 802, there is a reception delay 824 between the time T_7 that the network node's 802 antenna(s) receive the RTT response signal 820 and the time T_8 that the network node's 802 baseband processes the RTT response signal 820.

The difference between times T_2 and T_1 (i.e., transmission delay 814) and times T_8 and T_7 (i.e., reception delay 824) is referred to as the network node's 802 "group delay." The difference between times T_4 and T_3 (i.e., reception delay 816) and times T_6 and T_5 (i.e., transmission delay 826) is referred to as the UE's 804 "group delay." The group delay includes a hardware group delay, a group delay attributable to software/firmware, or both. More specifically, although software and/or firmware may contribute to group delay, the group delay is primarily due to internal hardware delays between the baseband and the antenna(s) of the network node 802 and the UE 804.

As shown in FIG. 8, because of the reception delay 816 and the transmission delay 826, the UE's 804 Rx-Tx time difference measurement 812 does not represent the difference between the actual reception time at time T_3 and the actual transmission time at time T_6. Similarly, because of the transmission delay 814 and the reception delay 824, the network node's 802 Tx-Rx time difference measurement 822 does not represent the difference between the actual transmission time at time T_2 and the actual reception time at time T_7. Thus, as shown, group delays, such as reception delays 814 and 816 and transmission delays 824 and 826, can contribute to timing errors and/or calibration errors that can impact RTT measurements, as well as other measurements, such as TDOA, RSTD, etc. This can in turn can impact positioning performance. For example, in some designs, a 10 ns error will introduce three meters of error in the final location estimate.

In some cases, the UE 804 can calibrate its group delay and compensate for it so that the Rx-Tx time difference measurement 812 reflects the actual reception and transmission times from its antenna(s). Alternatively, the UE 804 can report its group delay to the positioning entity (if not the UE 804), which can then subtract the group delay from the Rx-Tx time difference measurement 812 when determining the final distance between the network node 802 and the UE 804. Similarly, the network node 802 may be able to compensate for it group delay in the Tx-Rx time difference measurement 822, or simply report the group delay to the positioning entity.

In some cases, a UE may not be able to detect and measure the PRS transmitted by a non-serving (e.g., neighboring) base station (e.g., RTT measurement signals transmitted by neighboring base stations 602), especially for base stations that are far away from the UE. This may be a particular problem for low-tier UEs, also referred to as reduced-capability NR UEs, "NR RedCap" UEs, reduced-capability UEs, NR light UEs, light UEs, NR super light UEs, or super light UEs. Low-tier UEs are in contrast to premium UEs, which may alternatively be referred to as full-capability UEs or simply UEs. Low-tier UEs generally have lower baseband processing capability, fewer antennas (e.g., one receiver antenna as baseline in FR1 or FR2, two receiver antennas optionally), lower operational bandwidth capabilities (e.g., 20 MHz for FR1 with no supplemental uplink or carrier aggregation, or 50 or 100 MHz for FR2), only half duplex frequency division duplex (HD-FDD) capability, smaller HARQ buffer, reduced physical downlink control channel (PDCCH) monitoring, restricted modulation (e.g., 64 QAM for downlink and 16 QAM for uplink), relaxed processing timeline requirements, and/or lower uplink transmission power compared to premium UEs. Different UE tiers can be differentiated by UE category and/or by UE capability. For example, certain types of UEs may be assigned a classification (e.g., by the original equipment manufacturer (OEM), the applicable wireless communications standards, or the like) of "low-tier" and other types of UEs may be assigned a classification of "premium." Certain tiers of UEs may also report their type (e.g., "low-tier" or "premium") to the network. Additionally, certain resources and/or channels may be dedicated to certain types of UEs.

Similar to measuring downlink PRS from far away base stations, the measurement of an uplink positioning reference signal (e.g., SRS) by a faraway non-serving base station may be poor. Again, this may be especially problematic for SRS transmitted by low-tier UEs given their reduced transmit power. Accordingly, the present disclosure provides techniques to use RIS-based transmission and reception to improve the quality of PRS and/or SRS measurements involving non-serving base stations, which may enhance RTT-based positioning. However, as described above, different RIS may have different capabilities and/or operation modes (e.g., Mode 1, Mode 2), which need to be considered in an RIS-aided RTT positioning system.

A first technique described herein relates to an RIS operation mode/capability report for RTT based positioning. One or multiple RIS (e.g., RIS 410) may be controlled by one or multiple base stations (e.g., base stations 402). In the initial setup stage of an RIS-aided positioning session, each base station may report the operation mode of its associated RIS to the location sever (e.g., location server 230, LMF 270, SLP 272) or other positioning entity (e.g., the UE for UE-based positioning). The report should indicate the RIS operation mode (i.e., Mode 1 or Mode 2) of each RIS. For Mode 2 RIS, because of their higher processing capability, they may be able to compute and report Tx-Rx time difference measurements to their controlling base station(s). As such, for Mode 2 RIS, the report may also indicate, for each Mode 2 RIS, whether it can compute and report Tx-Rx time difference measurements. Alternatively, a Mode 2 RIS may not be able to compute and/or report its Tx-Rx time difference measurements, but another entity (e.g., the controlling base station) may be able to calculate the group delay (similar to the group delays of the base station 802 and the UE 804 in FIG. 8) of a Mode 2 RIS. In this case, the report may indicate that the group delay of the Mode 2 RIS can be reported, or may indicate the actual group delay measurement.

In some cases, however, a Mode 2 RIS may not be able to compute and/or report Tx-Rx time difference measurements, and no other entity (e.g., the controlling base station) may be able to determine the RIS' group delay. In this case, the controlling base station(s) should report the RIS as incapable of computing and reporting Tx-Rx time difference measurements or that the Tx-Rx time difference measurement cannot be obtained. This will indicate that the specific RIS cannot support RTT-based positioning.

Alternatively, if a Mode 2 RIS is not capable of computing and reporting Tx-Rx time difference measurements, but its group delay (as reported by another entity, such as the controlling base station) is less than or equal to 'x' ns (where 'x' is some small value, such as '2'), it may still be able to support RTT-based positioning. As a first option, the controlling base station(s) may report the RIS' maximum group delay. As a second option, the controlling base station may report the mean, variance, or average of the RIS' group delay. As yet another option, the group delay of the RIS may have been pre-measured and/or calibrated, and therefore the actual group delay could be used for positioning (and need not be less than 'x').

Figure 9:
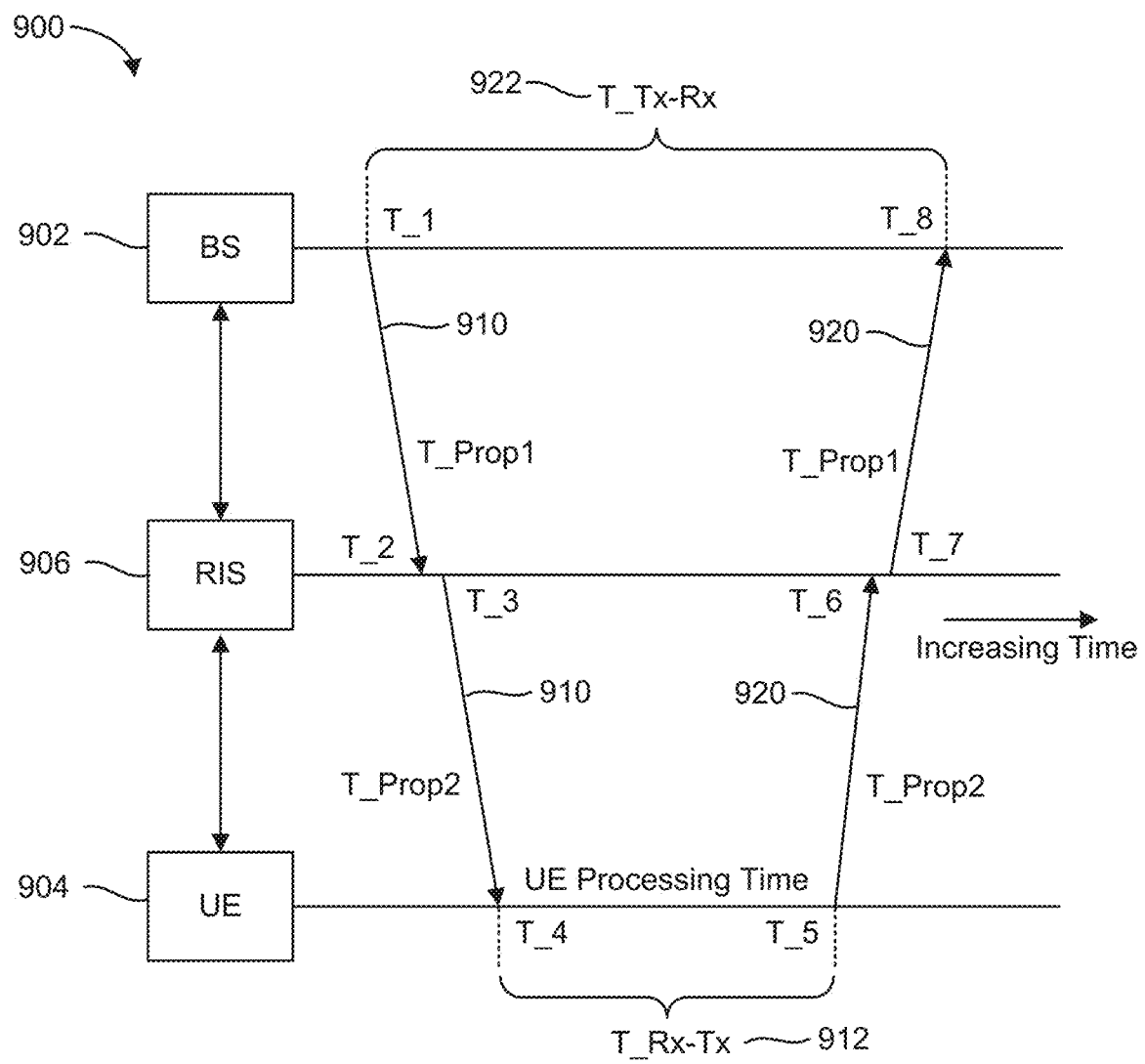
FIG. 9 is a diagram of a first type of RTT positioning procedure between a base station, a UE, and an RIS, according to aspects of the disclosure.

The different RIS operation modes and reported capabilities creates a need for different RTT positioning procedures. FIG. 9 is a diagram 900 of a first type of RTT positioning procedure between a base station 902 (e.g., any of the base stations described herein), a UE 904 (e.g., any of the UEs described herein), and an RIS 906 (e.g., RIS 410), according to aspects of the disclosure. The base station 902 may be the (or one of the) controlling base stations for the RIS 906. The base station 902 may be the serving base station 902 for the UE 904 or a neighboring base station 902.

The RTT positioning procedure illustrated in FIG. 9 can be performed when the RIS 906 is in Mode 1 (i.e., operating as a reconfigurable mirror/reflector), or when the RIS is in Mode 2 and cannot calculate and report Tx-Rx time difference measurements, but its group delay is less than some threshold number of nanoseconds (e.g., 'x' ns, where 'x' is some small number, such as '1') or was previously measured/calibrated. If these conditions on the operation of the RIS 906 are met, then the base station 902, the RIS 906, and the UE 904 can perform the RTT positioning procedure illustrated in FIG. 9.

The positioning entity (e.g., the UE 904 or a location server) can incorporate the threshold number of nanoseconds (e.g., 'x' ns) or the previously measured/calibrated group delay into the positioning uncertainty estimation.

As shown in FIG. 9, the base station 902 transmits an RTT measurement signal 910 (e.g., a PRS) to the RIS 906 at time T_1. The RTT measurement signal 910 has some propagation delay "T_Prop1" as it travels from the base station 902 to the RIS 906, and arrives at the RIS 906 at time T_2. At time T_3, the RIS 906 reflects the RTT measurement signal 910 towards the UE 904. The difference between time T_3 and time T_2 is the group delay of the RIS 906. Where the RIS 906 is a Mode 1 RIS, the difference between time T_3 and time T-2 is assumed to be negligible. Where the RIS 906 is a Mode 2 RIS, the difference between time T_3 and time T_2 should be less than a threshold in nanoseconds, as described above, or known from a previous calibration.

The RT measurement signal 910 has some propagation delay "T_Prop2" as it travels from the RIS 906 to the UE 904, and the UE 904 measures the RTT measurement signal 910 at time T_4. After some UE processing time, the UE 904 transmits an RTT response signal 920 (e.g., SRS) towards the RIS 906 at time T_5. The difference between T_5 and T_4 is the UE's 904 Rx-Tx time difference measurement 912, and is reported to the positioning entity (if not the UE 904). After the propagation delay T_Prop2, the RTT response signal 920 arrives at the RIS 906 at time T_6. At time T_7, the RIS 906 reflects the RTT response signal 920 towards the base station 902. The difference between time T_7 and time T_6 is the group delay of the RIS 906. After the propagation delay T_Prop1, the base station 902 measures the RTT response signal 920 from the UE 904 at time T_8. The difference between time T_8 and time T_1 is the base station's 902 Tx-Rx time difference measurement 922, and is reported to the positioning entity.

Based on the Rx-Tx time difference measurement 912 and the Tx-Rx time difference measurement 922, the positioning entity can calculate the distance (d) between the RIS 906 and the UE 904 as:

$$d = \frac{1}{2c}(T_{Tx-Rx} - T_{Rx-Tx}) - d_{BS\_RIS} = \frac{1}{2c}(T_8 - T_1) - \frac{1}{2c}(T_5 - T_4) - d_{BS\_RIS}$$

In the above equation, c is the speed of light and $d_{BS\_RIS}$ is the distance between the base station 902 and the RIS 906. The distance between the base station 902 and the RIS 906 is known by the location sever and can be provided to the UE 904 for UE-based positioning. Alternatively, this distance can be estimated through a RAT-based positioning technique (e.g., RTT) or a RAT-independent technique (e.g., GPS). As can be seen, the final distance estimation removes the distance between the base station 902 and the RIS 906. Based on the calculated distance and the known locations of the base station 902 and the RIS 906, as well as the distance between the UE 904 and at least two other base stations or RIS with known locations, the positioning entity can estimate the UE's 904 location, as described above.

Figure 10:
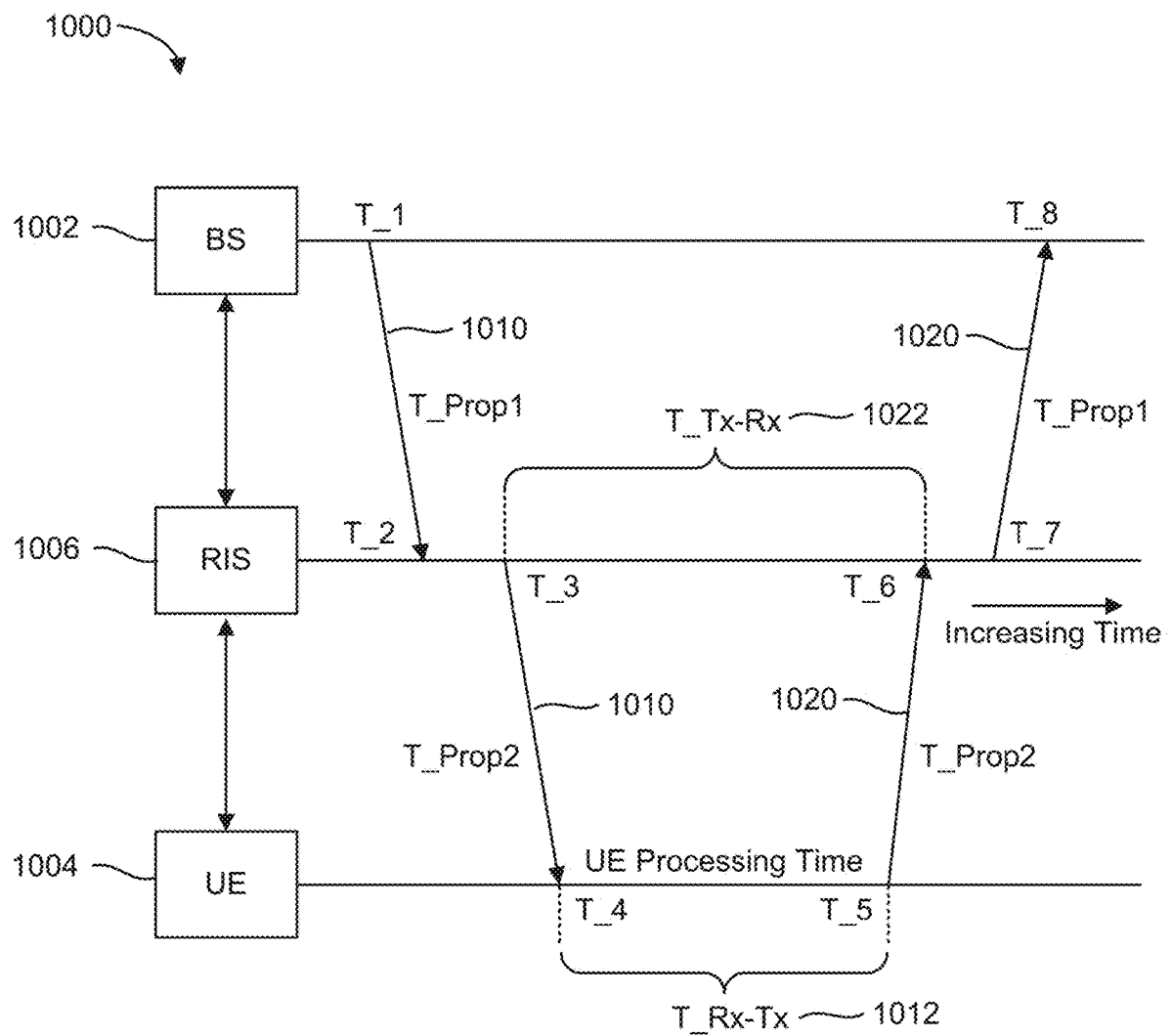
FIG. 10 is a diagram of a second type of RTT positioning procedure between a base station, a UE, and an RIS, according to aspects of the disclosure.

FIG. 10 is a diagram 1000 of a second type of RTT positioning procedure between a base station 1002 (e.g., any of the base stations described herein), a UE 1004 (e.g., any of the UEs described herein), and an RIS 1006 (e.g., RIS 410), according to aspects of the disclosure. The base station 1002 may be the (or one of the) controlling base stations for the RIS 1006. The base station 1002 may be the serving base station 1002 for the UE 1004 or a neighboring base station 1002. The RTT positioning procedure illustrated in FIG. 10 can be performed when the RIS 1006 is in Mode 2 and is able to calculate and report Tx-Rx time difference measurements to the controlling base station 1002.

As shown in FIG. 10, the base station 1002 transmits an RTT measurement signal 1010 (e.g., a PRS) to the RIS 1006 at time T_1. The RT measurement signal 1010 has some propagation delay "T_Prop1" as it travels from the base station 1002 to the RIS 1006, and arrives at the RIS 1006 at time T_2. At time T_3, the RIS 1006 reflects the RTT measurement signal 1010 to the UE 1004. The difference between time T_3 and time T_2 may be the group delay of the RIS 1006 (e.g., transmission delay 814), or it may be configured by the controlling base station 1002.

The RTT measurement signal 1010 has some propagation delay "T_Prop2" as it travels from the RIS 1006 to the UE 1004, and the UE 1004 measures the RTT measurement signal 1010 at time T_4. After some UE processing time, the UE 1004 transmits an RTT response signal 1020 (e.g., SRS) towards the RIS 1006 at time T_5. The difference between T_5 and T_4 is the UE's 1004 Rx-Tx time difference measurement 1012, and is reported to the positioning entity (if not the UE 1004). After the propagation delay T_Prop2, the RTT response signal 1020 arrives at the RIS 1006 at time T_6. At time T_7, the RIS 1006 reflects the RTT response signal 1020 towards the base station 1002. The difference between time T_7 and time T_6 may be the group delay of the RIS 1006 (e.g., reception delay 824), or it may be configured by the controlling base station 1002. After the propagation delay T_Prop1, the base station 1002 measures the RTT response signal 1020 from the UE 1004 at time T_8.

The difference between time T_6 and time T_3 is the RIS' 1006 Tx-Rx time difference measurement 1022. Unlike the RTT positioning procedure illustrated in FIG. 9, in the RTT positioning procedure illustrated in FIG. 10, the RIS 1006 is a Mode 2 RIS that can calculate and report Tx-Rx time difference measurements 1022. As such, at some point after time T_6, the RIS 1006 reports the Tx-Rx time difference measurement 1022 to the base station 1002 (to forward to the positioning entity), or directly to the positioning entity (if capable of doing so). The base station 1002 does not need to report its Tx-Rx time difference measurement (i.e., the difference between time T_8 and time T_1) to the positioning entity.

Based on the Rx-Tx time difference measurement 1012 and the Tx-Rx time difference measurement 1022, the positioning entity can calculate the distance (d) between the RIS 1006 and the UE 1004 as:

$$d = \frac{1}{2c}(T_{Tx-Rx} - T_{Rx-Tx}) = \frac{1}{2c}(T_6 - T_3) - \frac{1}{2c}(T_5 - T_4)$$

In the above equation, c is the speed of light. Based on the calculated distance and the known location of the RIS 1006, as well as the distance between the UE 1004 and at least two other base stations or RIS with known locations, the positioning entity can estimate the UE's 1004 location, as described above. Note that the location of the base station 1002 is not necessary.

In an aspect, still referring to FIG. 10, the base station 1002 may report times T_2, T_3, T_6, and T_7 to the positioning entity, or report the time differences between T_3 and T_2 and T_7 and T_6. In that case, the positioning entity can use the time difference between times T_8 and T_1 (i.e., the base station's 1002 Tx-Rx time difference measurement), rather than the RIS' 1006 Tx-Rx time difference measurement 1022, to calculate the distance between the base station 1002 and the UE 1004. The positioning entity can calculate the distance between the base station 1002 and the UE 1004 using the equation described above with reference to FIG. 9, with the addition of subtracting the time differences between T_3 and T_2 and T_7 and T_6 from the base station's 1002 Tx-Rx time difference measurement.

Figure 11:
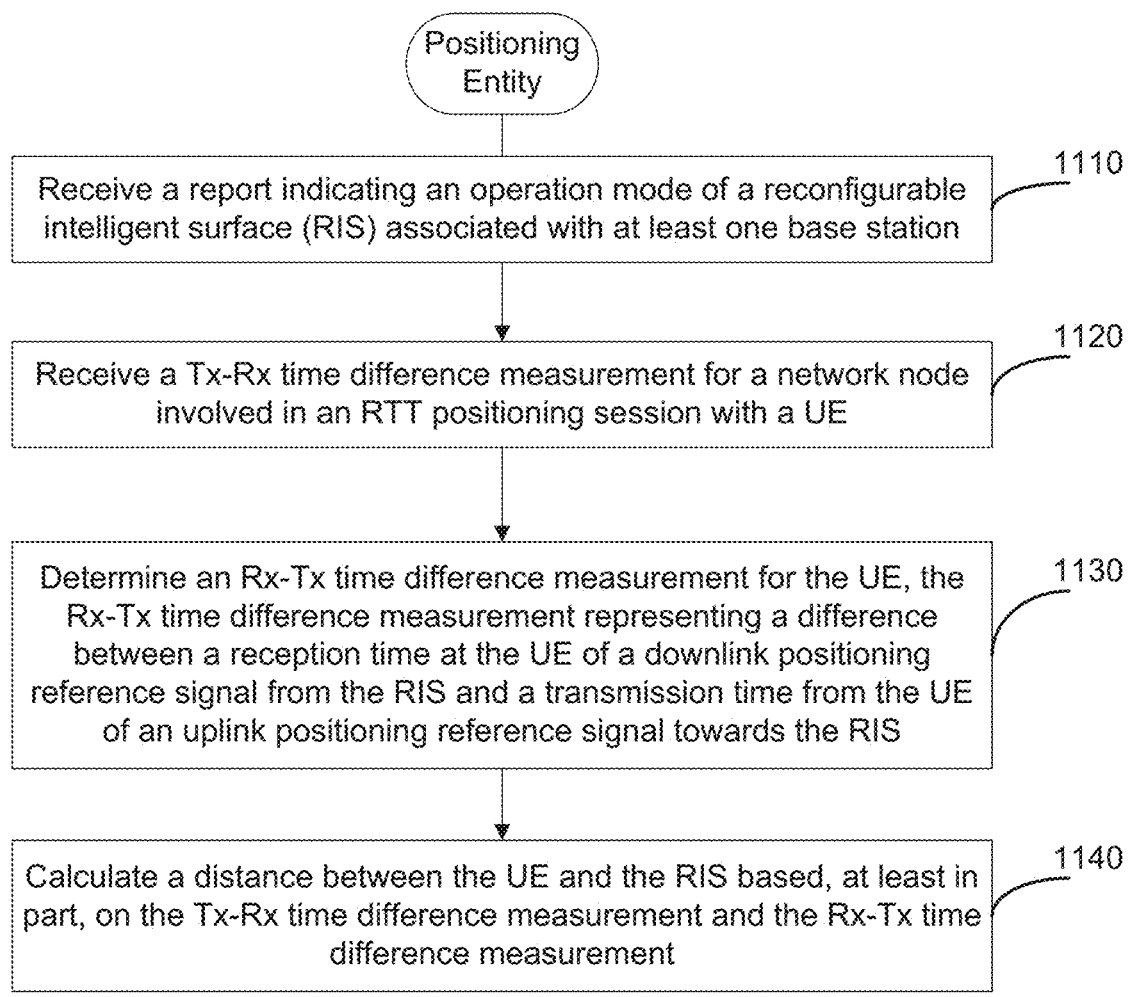
FIG. 11 illustrates an example method of positioning, according to aspects of the disclosure.

FIG. 11 illustrates an example method 1100 of positioning, according to aspects of the disclosure. In an aspect, method 1100 may be performed by a positioning entity. The positioning entity may be a UE (e.g., any of the UEs described herein), a component of the RAN (e.g., a base station or other RAN entity), a location server (e.g., location server 230. LMF 270, SLP 272).

At 1110, the positioning entity receives a report indicating an operation mode of a RIS (e.g., RIS 410) associated with at least one base station (e.g., any of the base stations described herein). In an aspect, where the positioning entity is a UE, operation 1110 may be performed by WWAN transceiver 310, processing system 332, memory component 340, and/or positioning component 342, any or all of which may be considered means for performing this operation. Where the positioning entity is a base station or other RAN entity, operation 1110 may be performed by WWAN transceiver 350, network interface(s) 380, processing system 384, memory component 386, and/or positioning component 388, any or all of which may be considered means for performing this operation. Where the positioning entity is a location server, operation 1110 may be performed by network interface(s) 390, processing system 394, memory component 396, and/or positioning component 398, any or all of which may be considered means for performing this operation.

At 1120, the positioning entity receives a Tx-Rx time difference measurement for a network node (e.g., the RIS or at least one base station) involved in a RTT positioning session with a UE (e.g., any of the UEs described herein). In an aspect, where the positioning entity is a UE, operation 1120 may be performed by WWAN transceiver 310, processing system 332, memory component 340, and/or positioning component 342, any or all of which may be considered means for performing this operation. Where the positioning entity is a base station or other RAN entity, operation 1120 may be performed by WWAN transceiver 350, network interface(s) 380, processing system 384, memory component 386, and/or positioning component 388, any or all of which may be considered means for performing this operation. Where the positioning entity is a location server, operation 1120 may be performed by network interface(s) 390, processing system 394, memory component 396, and/or positioning component 398, any or all of which may be considered means for performing this operation.

At 1130, the positioning entity determines an Rx-Tx time difference measurement for the UE, the Rx-Tx time difference measurement representing a difference between a reception time at the UE of a downlink positioning reference signal from the RIS and a transmission time from the UE of an uplink positioning reference signal towards the RIS. In an aspect, where the positioning entity is a UE, operation 1130 may be performed by WWAN transceiver 310, processing system 332, memory component 340, and/or positioning component 342, any or all of which may be considered means for performing this operation. Where the positioning entity is a base station or other RAN entity, operation 1130 may be performed by WWAN transceiver 350, network interface(s) 380, processing system 384, memory component 386, and/or positioning component 388, any or all of which may be considered means for performing this operation. Where the positioning entity is a location server, operation 1130 may be performed by network interface(s) 390, processing system 394, memory component 396, and/or positioning component 398, any or all of which may be considered means for performing this operation.

At 1140, the positioning entity calculates a distance between the UE and the RIS based, at least in part, on the Tx-Rx time difference measurement and the Rx-Tx time difference measurement. In an aspect, where the positioning entity is a UE, operation 1140 may be performed by WWAN transceiver 310, processing system 332, memory component 340, and/or positioning component 342, any or all of which may be considered means for performing this operation. Where the positioning entity is a base station or other RAN entity, operation 1140 may be performed by WWAN transceiver 350, network interface(s) 380, processing system 384, memory component 386, and/or positioning component 388, any or all of which may be considered means for performing this operation. Where the positioning entity is a location server, operation 1140 may be performed by network interface(s) 390, processing system 394, memory component 396, and/or positioning component 398, any or all of which may be considered means for performing this operation.

As will be appreciated, a technical advantage of the method 1100 is the improvement of PRS and SRS reception at the UE and base stations (particularly far away base stations), respectively, thereby improving positioning performance.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of positioning performed by a positioning entity, comprising: receiving a report indicating an operation mode of a reconfigurable intelligent surface (RIS) associated with at least one base station; receiving a transmission-to-reception (Tx-Rx) time difference measurement for a network node involved in a round-trip-time (RTT) positioning session with a user equipment (UE); determining a reception-to-transmission (Rx-Tx) time difference measurement for the UE, the Rx-Tx time difference measurement representing a difference between a reception time at the UE of a downlink positioning reference signal from the RIS and a transmission time from the UE of an uplink positioning reference signal towards the RIS; and calculating a distance between the UE and the RIS based, at least in part, on the Tx-Rx time difference measurement and the Rx-Tx time difference measurement.

Clause 2. The method of clause 1, wherein the operation mode of the RIS indicates that the RIS is operated as a reconfigurable reflector.

Clause 3. The method of clause 2, wherein, based on the RIS being operated as the reconfigurable reflector, the report does not include a group delay of the RIS.

Clause 4. The method of any of clauses 2 to 3, wherein: the network node is the at least one base station, the Tx-Rx time difference measurement represents a time difference between a transmission time from the at least one base station of the downlink positioning reference signal towards the RIS and a reception time at the at least one base station of the uplink positioning reference signal from the RIS, calculating the distance between the UE and the RIS comprises subtracting the distance between the at least one base station and the RIS from a distance calculated based, at least in part, on the Tx-Rx time difference measurement and the Rx-Tx time difference measurement.

Clause 5. The method of clause 1, wherein the operation mode of the RIS indicates that the RIS is operated as a relay node.

Clause 6. The method of clause 5, wherein the report further includes an indication that a Tx-Rx time difference of the RIS is not calculated and reported, the Tx-Rx time difference of the RIS representing time differences between transmission times from the RIS of downlink positioning reference signals towards the UE and reception times at the RIS of uplink positioning reference signals from the UE.

Clause 7. The method of clause 6, wherein the report further includes a group delay of the RIS.

Clause 8. The method of clause 7, wherein the group delay is included in the report as: a mean of the group delay of the RIS, an average of the group delay of the RIS, a variance of the group delay of the RIS, a maximum of the group delay of the RIS, a previously calibrated group delay of the RIS, or any combination thereof.

Clause 9. The method of any of clauses 7 to 8, wherein the group delay is less than a time threshold.

Clause 10. The method of clause 9, wherein: the network node is the at least one base station, the Tx-Rx time difference measurement represents a time difference between a transmission time from the at least one base station of the downlink positioning reference signal towards the RIS and a reception time at the at least one base station of the uplink positioning reference signal from the RIS, calculating the distance between the UE and the RIS comprises subtracting the distance between the at least one base station and the RIS from a distance calculated based, at least in part, on the Tx-Rx time difference measurement and the Rx-Tx time difference measurement.

Clause 11. The method of clause 10, wherein the distance between the UE and the RIS is calculated as:

$$d = \frac{1}{2c}(T_{Tx-Rx} - T_{Rx-Tx}) - d_{BS\_RIS}$$

where c is the speed of light, $T_{Rx-Tx}$ is the Rx-Tx time difference measurement, $T_{Tx-Rx}$ is the Tx-Rx time difference measurement, and $d_{BS\_RIS}$ is the distance between the at least one base station and the RIS.

Clause 12. The method of any of clauses 10 to 11, further comprising: calculating an uncertainty value for the distance between the UE and the RIS based, at least in part, on the time threshold.

Clause 13. The method of any of clauses 5 to 12, wherein the report further includes an indication that the RIS can calculate and report RIS Tx-Rx time difference measurements representing time differences between transmission times from the RIS of downlink positioning reference signals towards the UE and reception times at the RIS of uplink positioning reference signals from the UE.

Clause 14. The method of clause 13, wherein: the network node is the RIS, the Tx-Rx time difference measurement represents a time difference between a transmission time from the RIS of the downlink positioning reference signal towards the UE and a reception time at the RIS of the uplink positioning reference signal from the UE.

Clause 15. The method of clause 14, wherein the distance between the UE and the RIS is calculated as:

$$d = \frac{1}{2c}(T_{Tx-Rx} - T_{Rx-Tx})$$

where c is the speed of light, $T_{Rx\_Tx}$ is the Rx-Tx time difference measurement, and $T_{Tx-Rx}$ is the Tx-Rx time difference measurement.

Clause 16. The method of any of clauses 5 to 15, further comprising: receiving a first time difference measurement between a reception time at the RIS of the downlink positioning reference signal from the at least one base station and a transmission time from the RIS of the downlink positioning reference signal towards the UE; and receiving a second time difference measurement between a reception time at the RIS of the uplink positioning reference signal from the UE and a transmission time from the RIS of the uplink positioning reference signal towards the at least one base station.

Clause 17. The method of clause 16, wherein: the network node is the at least one base station, the Tx-Rx time difference measurement represents a time difference between a transmission time from the at least one base station of the downlink positioning reference signal towards the RIS and a reception time at the at least one base station of the uplink positioning reference signal from the RIS, calculating the distance between the UE and the RIS comprises subtracting the first time difference measurement and the second time difference measurement from the Tx-Rx time difference measurement and subtracting a distance between the at least one base station and the RIS from a distance calculated based, at least in part, on the Tx-Rx time difference measurement and the Rx-Tx time difference measurement.

Clause 18. The method of any of clauses 16 to 17, wherein the first time difference measurement and the second time difference measurement are configured by the at least one base station.

Clause 19. The method of any of clauses 1 to 18, wherein the Tx-Rx time difference measurement is received from the at least one base station.

Clause 20. The method of any of clauses 1 to 19, wherein: the positioning entity is a location server, and determining the Rx-Tx time difference measurement comprises receiving the Rx-Tx time difference measurement from the UE.

Clause 21. The method of any of clauses 1 to 19, wherein the positioning entity is the UE.

Clause 22. The method of any of clauses 1 to 21, wherein the at least one base station is a neighboring base station of the UE.

Clause 23. An apparatus comprising a memory, at least one transceiver, and at least one processor communicatively coupled to the memory and the at least one transceiver, the at least one processor configured to perform a method in accordance with any of clauses 1 to 22.

Clause 24. An apparatus comprising means for performing a method in accordance with any of clauses 1 to 22.

Clause 25. A computer-readable medium storing computer-executable instructions, the computer-executable instructions comprising at least one instruction for causing an apparatus to perform a method in accordance with any of clauses 1 to 22.

Clause 23. An apparatus comprising a memory and at least one processor communicatively coupled to the memory, the memory and the at least one processor configured to perform a method according to any of clauses 1 to 22.

Clause 24. An apparatus comprising means for performing a method according to any of clauses 1 to 22.

Clause 25. A non-transitory computer-readable medium storing computer-executable instructions, the computer-executable comprising at least one instruction for causing a computer or processor to perform a method according to any of clauses 1 to 22.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of positioning performed by a positioning entity, comprising:
   receiving a report indicating an operation mode of a reconfigurable intelligent surface (RIS) associated with at least one base station;
   receiving a transmission-to-reception (Tx-Rx) time difference measurement for a network node involved in a round-trip-time (RTT) positioning session with a user equipment (UE);
   determining a reception-to-transmission (Rx-Tx) time difference measurement for the UE, the Rx-Tx time difference measurement representing a difference between a reception time at the UE of a downlink positioning reference signal from the RIS and a transmission time from the UE of an uplink positioning reference signal towards the RIS; and
   calculating a distance between the UE and the RIS based, at least in part, on the Tx-Rx time difference measurement and the Rx-Tx time difference measurement.

2. The method of claim 1, wherein the operation mode of the RIS indicates that the RIS is operated as a reconfigurable reflector.

3. The method of claim 2, wherein, based on the RIS being operated as the reconfigurable reflector, the report does not include a group delay of the RIS.

4. The method of claim 2, wherein:
   the network node is the at least one base station,
   the Tx-Rx time difference measurement represents a time difference between a transmission time from the at least one base station of the downlink positioning reference signal towards the RIS and a reception time at the at least one base station of the uplink positioning reference signal from the RIS, and
   calculating the distance between the UE and the RIS comprises subtracting the distance between the at least one base station and the RIS from a distance calculated based, at least in part, on the Tx-Rx time difference measurement and the Rx-Tx time difference measurement.

5. The method of claim 1, wherein the operation mode of the RIS indicates that the RIS is operated as a relay node.

6. The method of claim 5, wherein the report further includes an indication that a Tx-Rx time difference of the RIS is not calculated and reported, the Tx-Rx time difference of the RIS representing time differences between transmission times from the RIS of downlink positioning reference signals towards the UE and reception times at the RIS of uplink positioning reference signals from the UE.

7. The method of claim 6, wherein the report further includes a group delay of the RIS.

8. The method of claim 7, wherein the group delay is included in the report as:
   a mean of the group delay of the RIS,
   an average of the group delay of the RIS,
   a variance of the group delay of the RIS,
   a maximum of the group delay of the RIS,
   a previously calibrated group delay of the RIS, or
   any combination thereof.

9. The method of claim 7, wherein the group delay is less than a time threshold.

10. The method of claim 9, wherein:
    the network node is the at least one base station,
    the Tx-Rx time difference measurement represents a time difference between a transmission time from the at least one base station of the downlink positioning reference signal towards the RIS and a reception time at the at least one base station of the uplink positioning reference signal from the RIS, and
    calculating the distance between the UE and the RIS comprises subtracting the distance between the at least one base station and the RIS from a distance calculated based, at least in part, on the Tx-Rx time difference measurement and the Rx-Tx time difference measurement.

11. The method of claim 10, wherein the distance between the UE and the RIS is calculated as:

$$d = \frac{1}{2c}(T_{Tx-Rx} - T_{Rx-Tx}) - d_{BS\_RIS}$$

where c is the speed of light, $T_{Rx-Tx}$ is the Rx-Tx time difference measurement, $T_{Tx-Rx}$ is the Tx-Rx time difference measurement, and $d_{BS\_RIS}$ is the distance between the at least one base station and the RIS.

12. The method of claim 10, further comprising:
    calculating an uncertainty value for the distance between the UE and the RIS based, at least in part, on the time threshold.

13. The method of claim 5, wherein the report further includes an indication that the RIS can calculate and report RIS Tx-Rx time difference measurements representing time differences between transmission times from the RIS of downlink positioning reference signals towards the UE and reception times at the RIS of uplink positioning reference signals from the UE.

14. The method of claim 13, wherein:
    the network node is the RIS, and
    the Tx-Rx time difference measurement represents a time difference between a transmission time from the RIS of the downlink positioning reference signal towards the UE and a reception time at the RIS of the uplink positioning reference signal from the UE.

15. The method of claim 14, wherein the distance between the UE and the RIS is calculated as:

$$d = \frac{1}{2c}(T_{Tx-Rx} - T_{Rx-Tx})$$

where c is the speed of light, $T_{Rx-Tx}$ is the Rx-Tx time difference measurement, and $T_{Tx-Rx}$ is the Tx-Rx time difference measurement.

16. The method of claim 5, further comprising:
    receiving a first time difference measurement between a reception time at the RIS of the downlink positioning reference signal from the at least one base station and a transmission time from the RIS of the downlink positioning reference signal towards the UE; and receiving a second time difference measurement between a reception time at the RIS of the uplink positioning reference signal from the UE and a transmission time from the RIS of the uplink positioning reference signal towards the at least one base station.

17. The method of claim 16, wherein:
the network node is the at least one base station,
the Tx-Rx time difference measurement represents a time difference between a transmission time from the at least one base station of the downlink positioning reference signal towards the RIS and a reception time at the at least one base station of the uplink positioning reference signal from the RIS, and
calculating the distance between the UE and the RIS comprises subtracting the first time difference measurement and the second time difference measurement from the Tx-Rx time difference measurement and subtracting the distance between the at least one base station and the RIS from a distance calculated based, at least in part, on the Tx-Rx time difference measurement and the Rx-Tx time difference measurement.

18. The method of claim 16, wherein the first time difference measurement and the second time difference measurement are configured by the at least one base station.

19. The method of claim 1, wherein the Tx-Rx time difference measurement is received from the at least one base station.

20. The method of claim 1, wherein:
the positioning entity is a location server, and
determining the Rx-Tx time difference measurement comprises receiving the Rx-Tx time difference measurement from the UE.

21. The method of claim 1, wherein the positioning entity is the UE.

22. The method of claim 1, wherein the at least one base station is a neighboring base station of the UE.

23. A positioning entity, comprising:
at least one memory;
at least one transceiver; and
at least one processor communicatively coupled to the memory and the at least one transceiver, the at least one processor configured to:
receive, via the at least one transceiver, a report indicating an operation mode of a reconfigurable intelligent surface (RIS) associated with at least one base station;
receive, via the at least one transceiver, a transmission-to-reception (Tx-Rx) time difference measurement for a network node involved in a round-trip-time (RTT) positioning session with a user equipment (UE);
determine a reception-to-transmission (Rx-Tx) time difference measurement for the UE, the Rx-Tx time difference measurement representing a difference between a reception time at the UE of a downlink positioning reference signal from the RIS and a transmission time from the UE of an uplink positioning reference signal towards the RIS; and
calculate a distance between the UE and the RIS based, at least in part, on the Tx-Rx time difference measurement and the Rx-Tx time difference measurement.

24. The positioning entity of claim 23, wherein the operation mode of the RIS indicates that the RIS is operated as a reconfigurable reflector.

25. The positioning entity of claim 24, wherein, based on the RIS being operated as the reconfigurable reflector, the report does not include a group delay of the RIS.

26. The positioning entity of claim 24, wherein:
the network node is the at least one base station,
the Tx-Rx time difference measurement represents a time difference between a transmission time from the at least one base station of the downlink positioning reference signal towards the RIS and a reception time at the at least one base station of the uplink positioning reference signal from the RIS, and
the at least one processor being configured to calculate the distance between the UE and the RIS comprises the at least one processor being configured to subtract the distance between the at least one base station and the RIS from a distance calculated based, at least in part, on the Tx-Rx time difference measurement and the Rx-Tx time difference measurement.

27. The positioning entity of claim 23, wherein the operation mode of the RIS indicates that the RIS is operated as a relay node.

28. The positioning entity of claim 27, wherein the report further includes an indication that a Tx-Rx time difference of the RIS is not calculated and reported, the Tx-Rx time difference of the RIS representing time differences between transmission times from the RIS of downlink positioning reference signals towards the UE and reception times at the RIS of uplink positioning reference signals from the UE.

29. The positioning entity of claim 28, wherein the report further includes a group delay of the RIS.

30. The positioning entity of claim 29, wherein the group delay is included in the report as:
a mean of the group delay of the RIS,
an average of the group delay of the RIS,
a variance of the group delay of the RIS,
a maximum of the group delay of the RIS,
a previously calibrated group delay of the RIS, or
any combination thereof.

31. The positioning entity of claim 29, wherein the group delay is less than a time threshold.

32. The positioning entity of claim 31, wherein:
the network node is the at least one base station,
the Tx-Rx time difference measurement represents a time difference between a transmission time from the at least one base station of the downlink positioning reference signal towards the RIS and a reception time at the at least one base station of the uplink positioning reference signal from the RIS, and
the at least one processor being configured to calculate the distance between the UE and the RIS comprises the at least one processor being configured to subtract the distance between the at least one base station and the RIS from a distance calculated based, at least in part, on the Tx-Rx time difference measurement and the Rx-Tx time difference measurement.

33. The positioning entity of claim 32, wherein the distance between the UE and the RIS is calculated as:

$$d = \frac{1}{2c}(T_{Tx-Rx} - T_{Rx-Tx}) - d_{BS\_RIS}$$

where c is the speed of light, $T_{Rx-Tx}$ is the Rx-Tx time difference measurement, $T_{Tx-Rx}$ is the Tx-Rx time difference measurement, and $d_{BS\_RIS}$ is the distance between the at least one base station and the RIS.

34. The positioning entity of claim 32, wherein the at least one processor is further configured to:
  calculate an uncertainty value for the distance between the UE and the RIS based, at least in part, on the time threshold.

35. The positioning entity of claim 27, wherein the report further includes an indication that the RIS can calculate and report RIS Tx-Rx time difference measurements representing time differences between transmission times from the RIS of downlink positioning reference signals towards the UE and reception times at the RIS of uplink positioning reference signals from the UE.

36. The positioning entity of claim 35, wherein:
  the network node is the RIS, and
  the Tx-Rx time difference measurement represents a time difference between a transmission time from the RIS of the downlink positioning reference signal towards the UE and a reception time at the RIS of the uplink positioning reference signal from the UE.

37. The positioning entity of claim 36, wherein the distance between the UE and the RIS is calculated as:

$$d = \frac{1}{2c}(T_{Tx-Rx} - T_{Rx-Tx})$$

where c is the speed of light, $T_{Rx-Tx}$ is the Rx-Tx time difference measurement, and $T_{Tx-Rx}$ is the Tx-Rx time difference measurement.

38. The positioning entity of claim 27, wherein the at least one processor is further configured to:
  receive, via the at least one transceiver, a first time difference measurement between a reception time at the RIS of the downlink positioning reference signal from the at least one base station and a transmission time from the RIS of the downlink positioning reference signal towards the UE; and
  receive, via the at least one transceiver, a second time difference measurement between a reception time at the RIS of the uplink positioning reference signal from the UE and a transmission time from the RIS of the uplink positioning reference signal towards the at least one base station.

39. The positioning entity of claim 38, wherein:
  the network node is the at least one base station,
  the Tx-Rx time difference measurement represents a time difference between a transmission time from the at least one base station of the downlink positioning reference signal towards the RIS and a reception time at the at least one base station of the uplink positioning reference signal from the RIS, and
  the at least one processor being configured to calculate the distance between the UE and the RIS comprises the at least one processor being configured to subtract the first time difference measurement and the second time difference measurement from the Tx-Rx time difference measurement and subtracting the distance between the at least one base station and the RIS from a distance calculated based, at least in part, on the Tx-Rx time difference measurement and the Rx-Tx time difference measurement.

40. The positioning entity of claim 38, wherein the first time difference measurement and the second time difference measurement are configured by the at least one base station.

41. The positioning entity of claim 23, wherein the Tx-Rx time difference measurement is received from the at least one base station.

42. The positioning entity of claim 23, wherein:
  the positioning entity is a location server, and
  the at least one processor being configured to determine the Rx-Tx time difference measurement comprises the at least one processor being configured to receive the Rx-Tx time difference measurement from the UE.

43. The positioning entity of claim 23, wherein the positioning entity is the UE.

44. The positioning entity of claim 23, wherein the at least one base station is a neighboring base station of the UE.

45. A positioning entity, comprising:
  means for receiving a report indicating an operation mode of a reconfigurable intelligent surface (RIS) associated with at least one base station;
  means for receiving a transmission-to-reception (Tx-Rx) time difference measurement for a network node involved in a round-trip-time (RTT) positioning session with a user equipment (UE);
  means for determining a reception-to-transmission (Rx-Tx) time difference measurement for the UE, the Rx-Tx time difference measurement representing a difference between a reception time at the UE of a downlink positioning reference signal from the RIS and a transmission time from the UE of an uplink positioning reference signal towards the RIS; and
  means for calculating a distance between the UE and the RIS based, at least in part, on the Tx-Rx time difference measurement and the Rx-Tx time difference measurement.

46. A non-transitory computer-readable medium storing computer-executable instructions, the computer-executable instructions comprising:
  at least one instruction instructing a positioning entity to receive a report indicating an operation mode of a reconfigurable intelligent surface (RIS) associated with at least one base station;
  at least one instruction instructing the positioning entity to receive a transmission-to-reception (Tx-Rx) time difference measurement for a network node involved in a round-trip-time (RTT) positioning session with a user equipment (UE);
  at least one instruction instructing the positioning entity to determine a reception-to-transmission (Rx-Tx) time difference measurement for the UE, the Rx-Tx time difference measurement representing a difference between a reception time at the UE of a downlink positioning reference signal from the RIS and a transmission time from the UE of an uplink positioning reference signal towards the RIS; and
  at least one instruction instructing the positioning entity to calculate a distance between the UE and the RIS based, at least in part, on the Tx-Rx time difference measurement and the Rx-Tx time difference measurement.

* * * * *